(12) United States Patent
Felix et al.

(10) Patent No.: US 11,709,794 B2
(45) Date of Patent: Jul. 25, 2023

(54) EXCHANGE BETWEEN STACKED DIE

(71) Applicant: Graphcore Limited, Bristol (GB)

(72) Inventors: Stephen Felix, Bristol (GB); Richard Luke Southwell Osborne, Bristol (GB); Alan Graham Alexander, Wotton-Under-Edge (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 17/451,372

(22) Filed: Oct. 19, 2021

(65) Prior Publication Data

US 2022/0229802 A1     Jul. 21, 2022

(30) Foreign Application Priority Data

Jan. 20, 2021 (GB) .................................. 2100742

(51) Int. Cl.
*G06F 15/80* (2006.01)
*G06F 13/36* (2006.01)

(52) U.S. Cl.
CPC .............. *G06F 15/80* (2013.01); *G06F 13/36* (2013.01)

(58) Field of Classification Search
None
See application file for complete search history.

(56) References Cited

U.S. PATENT DOCUMENTS

| 8,811,430 B2* | 8/2014 | Wagh ..................... H04L 69/22 370/476 |
| 2015/0178092 A1* | 6/2015 | Mishra ................... G06F 15/163 712/29 |
| 2016/0173413 A1* | 6/2016 | Khare .................... H04L 49/109 370/401 |
| 2018/0101502 A1* | 4/2018 | Nassif ................... G06F 9/5038 |
| 2019/0121680 A1* | 4/2019 | Wilkinson ............. G06F 9/3851 |
| 2019/0227963 A1* | 7/2019 | Ooi ........................ G06F 30/34 |
| 2019/0250985 A1* | 8/2019 | Seo ...................... G06F 11/1068 |
| 2019/0303033 A1* | 10/2019 | Noguera Serra ... G06F 15/7807 |
| 2020/0012537 A1* | 1/2020 | Lacey ................. G06F 13/4059 |
| 2020/0326939 A1* | 10/2020 | Ware ..................... G06F 9/3001 |

* cited by examiner

*Primary Examiner* — Eric Coleman
(74) *Attorney, Agent, or Firm* — Haynes and Boone LLP

(57) ABSTRACT

Two or more die are stacked together in a stacked integrated circuit device. Each of the processors on these die is able to communicate with other processors on its die by sending data over the switching fabric of its respective die. The mechanism for sending data between processors on the same die (i.e. intradie communication) is reused for sending data between processors on different die (i.e. interdie communication). The reuse of the mechanism is enabled by assigning each processor a vertical neighbour on its opposing die. Each processor has an interdie connection that connects it to the output exchange bus of its neighbour. A processor is able to borrow the output exchange bus of its neighbour by sending data along the output exchange bus of its neighbour.

22 Claims, 14 Drawing Sheets

EXCHANGE BETWEEN STACKED DIE

CROSS-REFERENCE TO RELATED APPLICATIONS

The present application claims priority to United Kingdom Patent Application No. 2100742.2, filed on Jan. 20, 2021, the disclosure of which is hereby incorporated herein by reference in its entirety.

TECHNICAL FIELD

The present disclosure relates to a stacked integrated circuit device and in particular to the exchange of data between stacked die of the stacked integrated circuit device.

BACKGROUND

Parallelism in computing takes different forms. Program fragments may be organised to execute concurrently (where they overlap in time but may share execution resources) or in parallel where they execute on different resources possibly at the same time.

Parallelism in computing can be achieved in a number of ways, such as by means of an array of multiple interconnected processor tiles, or a multi-threaded processing unit, or indeed a multi-tile array in which each tile comprises a multi-threaded processing unit.

When parallelism is achieved by means of a processing unit comprising an array of multiple tiles on the same chip (or chips in the same integrated circuit package), each tile comprises its own separate respective processing unit with local memory (including program memory and data memory). Thus separate portions of program code can be run concurrently on different tiles. The tiles are connected together via an on-chip interconnect, which enables the code run on the different tiles to communicate between tiles. In some cases, the processing unit on each tile may take the form of a barrel-threaded processing unit (or other multi-threaded processing unit). Each tile may have a set of contexts and an execution pipeline such that each tile can run multiple interleaved threads concurrently.

An example use of multi-threaded and/or multi-tiled parallel processing is found in machine intelligence. As will be familiar to those skilled in the art of machine intelligence, machine intelligence algorithms are capable of producing knowledge models and using the knowledge model to run learning and inference algorithms. A machine intelligence model incorporating the knowledge model and algorithms can be represented as a graph of multiple interconnected nodes. Each node represents a function of its inputs. Some nodes receive the inputs to the graph and some receive inputs from one or more other nodes. The output activation of some nodes form the inputs of other nodes, and the output of some nodes provide the output of the graph, and the inputs to the graph provide the inputs to some nodes. Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs, or other introspective forms of analysis can be performed on it.

A multi tile processing unit may be formed as part of an integrated circuit (or chip). An integrated circuit is a set of electronic circuits that are manufactured on a single piece of semiconductor material (e.g. silicon). Typically, integrated circuits are produced in large batches on a single large wafer of the semiconductor material, which is then cut into pieces, with each piece containing a copy of the integrated circuit. Each of these pieces is referred to as a die.

SUMMARY

When building a parallel processing system having multi-tile processing units, it is desirable to enable a large numbers of tiles to communicate with one another at low latency. To some extent this can be achieved by increasing the number of tiles on a die. However, there is a limit to the number of tiles that can be manufactured on a single die. It is desirable to have a way of connecting together larger numbers of tiles in a way that still allows for low latency communication between the tiles.

According to a first aspect, there is provided a stacked integrated circuit device comprising: a first die comprising a plurality of processors and a switching fabric for exchanging data between the first plurality of processors; and a second die comprising a plurality of processors and a switching fabric for exchanging data between the second plurality of processors, wherein the second die and first die are stacked together, wherein for each of the first die and the second die, each of the processors of the respective die has: an output exchange bus connected to the switching fabric of the respective die for sending a first data packet to another of the processors of the respective die accessible over the switching fabric of the respective die; at least one input wire for receiving further data packets from another of the processors of the respective die accessible over the switching fabric of the respective die; and at least one interdie data connection wire connected to the output exchange bus of a corresponding one of the processors on the other die, wherein the respective processor is operable to send, over the at least one interdie data connection wire, a second data packet over the switching fabric of the other die to one of the processors of the other die.

Two or more die are stacked together in a stacked integrated circuit device. Each of the processors on these die is able to communicate at low latency with other processors on its die by sending data over the switching fabric of its respective die. This mechanism for sending data between processors on the same die (i.e. intradie communication) is reused for sending data between processors on different die (i.e. interdie communication). The reuse of the mechanism is enabled by assigning each processor a vertical neighbour on its opposing die. Each processor has an interdie connection that connects it to the output exchange bus of its neighbour. A processor is able to borrow the output exchange bus of its neighbour by sending data along the output exchange bus of its neighbour. By doing so, the processor sends data to one or more processors on the neighbour's die using the same mechanism by which its neighbour would send data to processors on the neighbour's die. This enables low latency communication between the processors of the two die. Furthermore, since the same switching fabrics used for intradie communication are reused for interdie communication, duplication of the switching fabric hardware may be avoided.

In some embodiments, for each of the first die and the second die, each of the processors of the respective die has an associated output multiplexer for outputting data packets onto the output exchange bus of the respective processor, each output multiplexer having: a first input for receiving one of the first data packets from its associated processor for outputting the first data packet onto the output exchange bus of the associated processor; and a second input for receiving one of the second data packets from the corresponding processor of the associated processor via the respective at least one interdie data connection wire of the corresponding processor.

In some embodiments, for each of the first die and the second die, each of the processors of the respective die has an interdie control connection wire connected to the output multiplexer of the corresponding processor for controlling a selection between the first input and the second input. In some embodiments, for each of the first die and the second die: each of at least some of the processors of the respective die has an associated input multiplexer configured to receive one of the second data packets from the switching fabric of the respective die, each of at least some of the processors of the respective die is operable to function as a receiving processor to receive the respective one of the second data packets from a processor on the other die at a predetermined receive time relative to a predetermined send time of the one of the second data packets from the processor of the other die, the respective receiving processor being operable to receive the one of the second data packets at the predetermined receive time by controlling its associated input multiplexer to connect to the switching fabric of the respective die at a predetermined switch time.

In some embodiments, each of the predetermined receive time, predetermined send time and predetermined switch time are timed with respect to a synchronisation signal issued by a synchronisation controller of the stacked integrated circuit device.

In some embodiments, each of the first data packets and second data packets is transmitted by one of the processors of the first die and the second die without an identifier of a destination processor.

In some embodiments, the stacked integrated circuit device is configured to operate in: a compute phase, during which at least some of the processors of the first die and the second die are configured to perform computations on input data to generate results without exchanging data between the processors; and an exchange phase, during which at least some of the processors of the first die and the second die are configured to exchange data with one another using the output exchange buses and the interdie data connections wires, wherein the compute phase is separated from the exchange phase by a predetermined synchronisation barrier.

In some embodiments, the stacked integrated circuit device is configured to operate in: an intradie exchange period, during which at least some of the processors of the first die are each configured to send data to at least one other processor of the first die without sending data to the processors of the second die, and at least some of the processors of the second die are each configured to send data to at least one other of the processors of the second die without sending data to the processors of the first die; and at a different time, an interdie exchange period, during which at least some of the processors of the first die are each configured to send data to at least one of the processors of the second die without sending data to the processors of the first die, and at least some of the processors of the second die are each configured to send data to at least one of the processors of the first die without sending data to the processors of the second die.

In some embodiments, the intradie die exchange period and interdie exchange period belong to a single instance of the exchange phase.

In some embodiments, each of the first die and the second die has clock distribution wiring for clocking transfer of data along exchange wiring of the respective die, the exchange wiring including at least the switching fabric, output exchange buses, and interdie data connection wires of the respective die, wherein the stacked integrated circuit device comprises a plurality of interdie clock signal connections, each connecting the clock distribution wiring of the first die to the clock distribution wiring of the second die.

In some embodiments, for each of the first die and the second die, the respective clock distribution wiring has a plurality of buffer stages at which a clock signal is buffered, wherein each of the plurality of interdie clock signal connections connects one of the buffer stages of the first die to one of the buffer stages of the second die.

In some embodiments, each of the plurality of processors on the first die and the second die is configured to run a local program, wherein the local programs are generated as a related set at compile time.

In some embodiments, each of the plurality of processors on the first die and the second die is configured to run a local program, wherein for each of the processors of the first die and the second die, the respective local program is configured to only execute a send instruction to send data over the output exchange bus of the respective processor if a conflict on that output exchange bus would not occur due to sending of data by the respective processor's corresponding processor over that corresponding processor's at least one interdie data connection wire.

According to a second aspect, there is provided a method implemented in a stacked integrated circuit device comprising a first die comprising a plurality of processors and a second die comprising a plurality of processors, wherein the method comprises, for each of the processors of the first die and the second die performing the steps of: transmitting a first data packet on an output exchange bus of the respective processor to a switching fabric of the die to which the respective processor belongs, the respective first data packet being for delivery to another of the processors of that die; receiving further data packets from another of the processors of the die to which the respective processor belongs from over the switching fabric of the die to which the respective processor belongs; and sending a second data packet over at least one interdie data connection wire connected to the output exchange bus of a corresponding one of the processors on the other die of the stacked integrated circuit device, the respective second data packet being for delivery over a switching fabric of the other die to one of the processors of the other die.

In some embodiments, the method comprises for each of the processors of the first die and the second die the steps of: receiving one of the first data packets at a first input of an output multiplexer associated with the respective processor; receiving one of the second data packets at a second input of the associated output multiplexer from the corresponding processor of the respective processor; and outputting the data packets received at the first input and the second input of the associated output multiplexer to the output exchange bus of the respective processor.

In some embodiments, the method comprises for each of the processors of the first die and the second die the steps of:

at the output multiplexer of the respective processor, controlling a selection between the first input and the second input in response to a signal received on an interdie control connection wire connected to the corresponding processor of the respective processor.

In some embodiments, the method comprises for each of the processors of the first die and the second die: receiving at an input multiplexer associated with the respective processor, one of the second data packets from the switching fabric of the respective die, the one of the second data packets being sent from a processor on the other die; receiving the one of the second data packets at the respective processor at a predetermined receive time relative to a predetermined send time of the one of the second data packets from the processor of the other die, wherein the one of the second data packets is received at the predetermined receive time by controlling the respective input multiplexer to connect to the switching fabric of the respective die at a predetermined switch time.

In some embodiments, the method comprises issuing a synchronisation signal from a synchronisation controller of the stacked integrated circuit device to each of the processors on the first die and the second die, wherein each of the predetermined receive time, predetermined send time and predetermined switch time are timed with respect to the synchronisation signal issued by the synchronisation controller.

In some embodiments, the method comprises transmitting each of the first data packets and second data packets without an identifier of a destination processor.

According to a third aspect, there is provided a computer program comprising a plurality of local programs, wherein a first plurality of the local programs are suitable for execution on respective processors of a first die of a stacked integrated circuit device, wherein a second plurality of the local programs are suitable for execution on respective processors of a second die of the stacked integrated circuit device, wherein each of at least some of the local programs is configured to, when executed on its respective processor, cause that processor to perform the steps of: transmitting a first data packet on an output exchange bus of the respective processor to a switching fabric of the die to which the respective processor belongs, the respective first data packet being for delivery to another of the processors of that die; receiving further data packets from another of the processors of the die to which the respective processor belongs from over the switching fabric of the die to which the respective processor belongs; and sending a second data packet over at least one interdie data connection wire connected to the output exchange bus of a corresponding one of the processors on the other die of the stacked integrated circuit device, the respective second data packet being for delivery over a switching fabric of the other die to one of the processors of the other die.

According to a fourth aspect, there is provided a non-transitory computer readable medium storing the computer program according to the third aspect.

BRIEF DESCRIPTION OF THE DRAWINGS

For a better understanding of the present invention and to show how the same may be carried into effect reference will now be made by way of example to the following drawings.

DETAILED DESCRIPTION

The present disclosure relates to a stacked integrated circuit device. The stacked integrated circuit device may also be known as a three dimensional integrated circuit device. Throughout this description, the device is referred to as the stacked device. The stacked device comprises two or more die, stacked one on top of the other. Each of the die comprise a processing unit comprising a plurality of processors. An example such processing unit is the IPU (Intelligence Processing Unit), so named to denote its adaptivity to machine intelligence applications. The IPU is described in more detail in U.S. application Ser. No. 16/276,834, which is incorporated by reference.

Firstly, an example processing unit 2 that may be implemented in each of the die of the stacked device is described.

Figure 1:
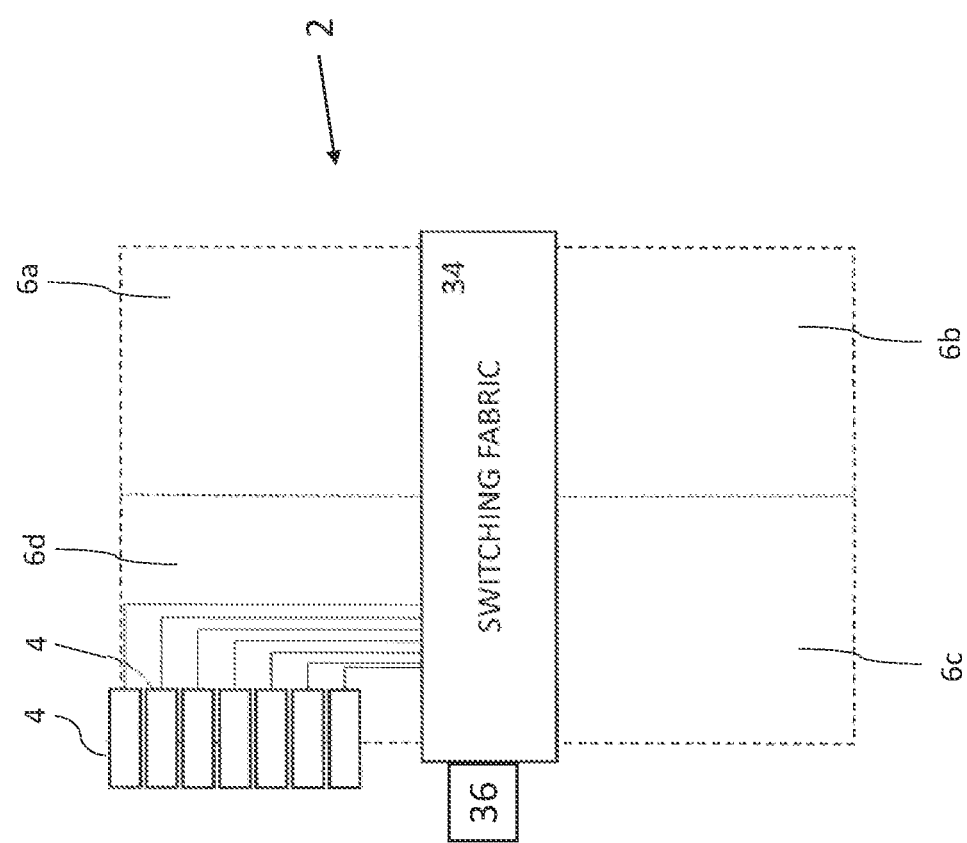
FIG. 1 illustrates an example of a processing unit comprising a plurality of processor tiles.

FIG. 1 illustrates schematically the architecture of an example processing unit 2. To form a larger computer, the processing units 2 can be connected together. The processing unit 2 comprises multiple processors, referred to herein as tiles 4. In one embodiment, there are 1216 tiles organised in arrays 6*a*, 6*b*, 6*c*, and 6*d*. The processing unit 2 can be considered as having East and West regions, and North and South regions. 6*a* may be referred to as "North East array", 6*b* may be referred to as "South East array", 6*c* may be referred to as "South West array", and 6*d* may be referred to as "North West array". In the described example, each array has four columns of 76 tiles (in fact generally there will be 80 tiles, for redundancy purposes). It will be appreciated that the concepts described herein extend to a number of different physical architectures—one example is given here to aid understanding.

The processing unit 2 receives work from a host (not shown), which is connected to the processing unit 2 via one of the chip-to-host links in the form of input data to be processed by the processing unit 2. A host may access a computer, which is architected as a single processing unit 2 or a group of multiple interconnected processing units 2 depending on the workload from the host application.

The processing unit 2 comprises a switching fabric 34 to which all tiles and links are connected by sets of connection wires, the switching fabric being stateless, i.e. having no program visible state. Each set of connection wires is fixed end to end. The wires are pipelined. In this embodiment, a set comprises 32 data wires plus control wires, e.g. a valid bit. Each set can carry a 32-bit data packet, but note herein that the word "packet" denotes a set of bits representing a datum (sometimes referred to herein as a data item), perhaps with one or more valid bit. The "packets" may be sent without destination identifiers which would permit an intended recipient to be uniquely identified. Instead, they may each represent a numerical or logical value input to or output from a tile. The packets may include headers indicating at least one direction of travel through the switching fabric 34, however. Each tile 4 has its own local memory (described later). The tiles 4 do not share memory. The switching fabric constitutes a cross set of connection wires connected to multiplexers and tiles, as described later, and does not hold any program visible state. The switching fabric is considered to be stateless and does not use any memory. Data exchange between tiles 4 may be conducted on a time deterministic basis as described herein. In this case, the switching fabric comprises a pipelined connection wire comprising a series of temporary stores, e.g. latches or flip flops, which hold datum for a clock cycle before releasing it to the next store. Time of travel along the wire is determined by these temporary stores, each one using up a clock cycle of time in a path between any two points.

Each column is associated with a respective group of exchange wires as described later. Columns using groups of wires physically closer to them have lower latencies for inter-column exchanges than a column using a group of wires which is located further away.

Figure 2:
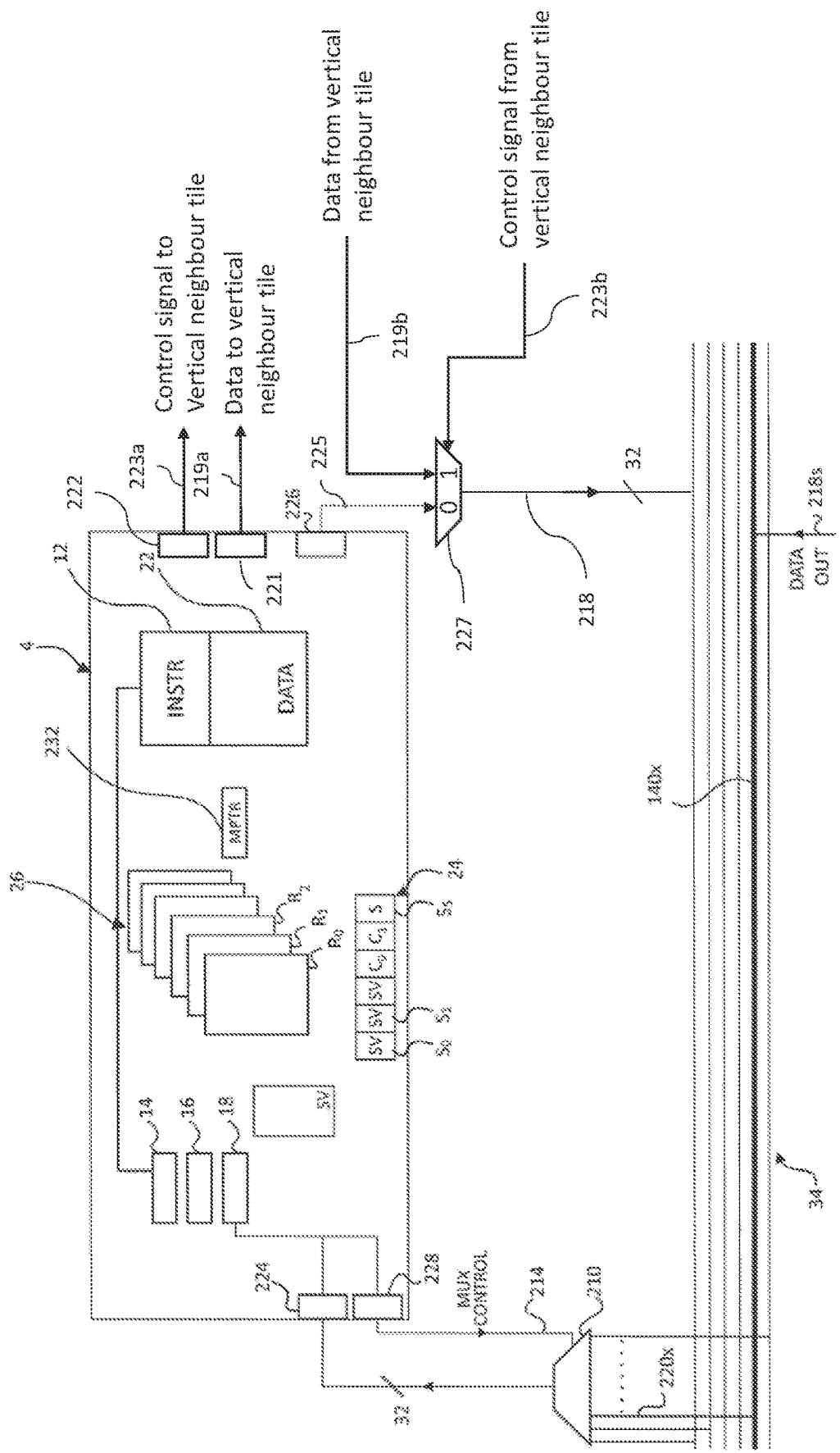
FIG. 2 is a schematic diagram of a tile connected to the switching fabric.

FIG. 2 illustrates an example tile 4 in accordance with embodiments of the present disclosure. In the tile, multiple threads are interleaved through a single execution pipeline. The tile 4 comprises: a plurality of contexts 26 each arranged to represent the state of a different respective one of a plurality of threads; a shared instruction memory 12 common to the plurality of threads; a shared data memory 22 that is also common to the plurality of threads; a shared execution pipeline 14, 16, 18 that is again common to the plurality of threads; and a thread scheduler 24 for scheduling the plurality of threads for execution through the shared pipeline in an interleaved manner. The thread scheduler 24 is schematically represented in the diagram by sequence of time slots $S_0 \ldots S_5$, but in practice is a hardware mechanism managing program counters of the threads in relation to their time slots. The execution pipeline comprises a fetch stage 14, a decode stage 16, and an execution stage 18 comprising an execution unit (EXU) and a load/store unit (LSU). Each of the contexts 26 comprises a respective set of registers $R_0$, $R_1 \ldots$ for representing the program state of the respective thread.

The fetch stage 14 is connected to fetch instructions to be executed from the instruction memory 12, under control of the thread scheduler 24. The thread scheduler 24 is configured to control the fetch stage 14 to fetch instructions from the local program for execution in each time slot as will be discussed in more detail below.

The fetch stage 14 has access to a program counter (PC) of each of the threads that is currently allocated to a time slot. For a given thread, the fetch stage 14 fetches the next instruction of that thread from the next address in the instruction memory 12 as indicated by the thread's program counter. Note that an instruction as referred to herein, means a machine code instruction, i.e. an instance of one of the fundamental instructions of the computer's instruction set, made up of an opcode and zero or more operands. Note too that the program loaded into each tile is determined by a processor or compiler to allocate work based on the graph of the machine intelligence model being supported.

The fetch stage 14 then passes the fetched instruction to the decode stage 16 to be decoded, and the decode stage 16 then passes an indication of the decoded instruction to the execution stage 18 along with the decoded addresses of any operand registers of the current context specified in the instruction, in order for the instruction to be executed.

In the present example, the thread scheduler 24 interleaves threads according to a round-robin scheme whereby, within each round of the scheme, the round is divided into a sequence of time slots $S_0$, $S_1$, $S_2$, $S_3$, each for executing a respective thread. Typically, each slot is one processor cycle long and the different slots are evenly sized (though not necessarily so in all possible embodiments). This pattern then repeats, each round comprising a respective instance of each of the time slots (in embodiments in the same order each time, though again not necessarily so in all possible embodiments). Note, therefore, that a time slot as referred to herein means the repeating allocated place in the sequence, not a particular instance of the time slot in a given repetition of the sequence.

In the illustrated embodiment, there are eight time slots, but other numbers are possible. Each time slot is associated with hardware resource, e.g. register, for managing the context of an executing thread.

One of the contexts 26, labelled SV, is reserved for a special function, to represent the state of a "supervisor" (SV) whose job it is to coordinate the execution of "worker" threads. The supervisor can be implemented as a program organised as one or more supervisor threads which may run concurrently. The supervisor thread may also be responsible for performing barrier synchronisations described later or may be responsible for exchanging data on and off the tile, as well as in and out of local memory so that is can be shared between the worker threads between computations. The supervisor thread implements exchange code, which is the instructions involved in exchanging data on and off the tile. The thread scheduler 24 is configured so as, when the program as a whole starts, to begin by allocating the supervisor thread to all of the time slots, i.e. so the supervisor SV starts out running in all time slots $S_0 \ldots S_s$. However, the supervisor thread is provided with a mechanism for, at some subsequent point (either straight away or after performing one or more supervisor tasks), temporarily relinquishing each of the slots in which it is running to a respective one of the worker threads $C_0$, $C_1$ denote slots to which a worker thread has been allocated. This is achieved by the supervisor thread executing a relinquish instruction.

Each worker thread is a codelet intended to represent a vertex in the graph and to execute atomically. That is all the data it consumes is available at launch and all the data it produces is not visible to other threads until it exits. It runs to completion (excepting error conditions). The data address may specify some data to be acted upon by the codelet. Alternatively, the relinquish instruction may take only a single operand specifying the address of the codelet, and the data address could be included in the code of the codelet; or the single operand could point to a data structure specifying the addresses of the codelet and data. Codelets may be run concurrently and independently of one another.

Each of the worker threads in slots $C_0$, $C_1$ performs its one or more computation tasks. At the end of its task(s), the worker thread then hands the time slot in which it is running back to the supervisor thread. This is achieved by the worker thread executing an exit instruction. This instruction acts on the thread scheduler 24 so that the time slot in which it is executed is returned back to the supervisor thread. The supervisor thread can then perform one or more supervisor subsequent tasks (e.g. barrier synchronization and/or exchange of data), and/or continue to execute another relinquish instruction, and so forth.

Figure 3:
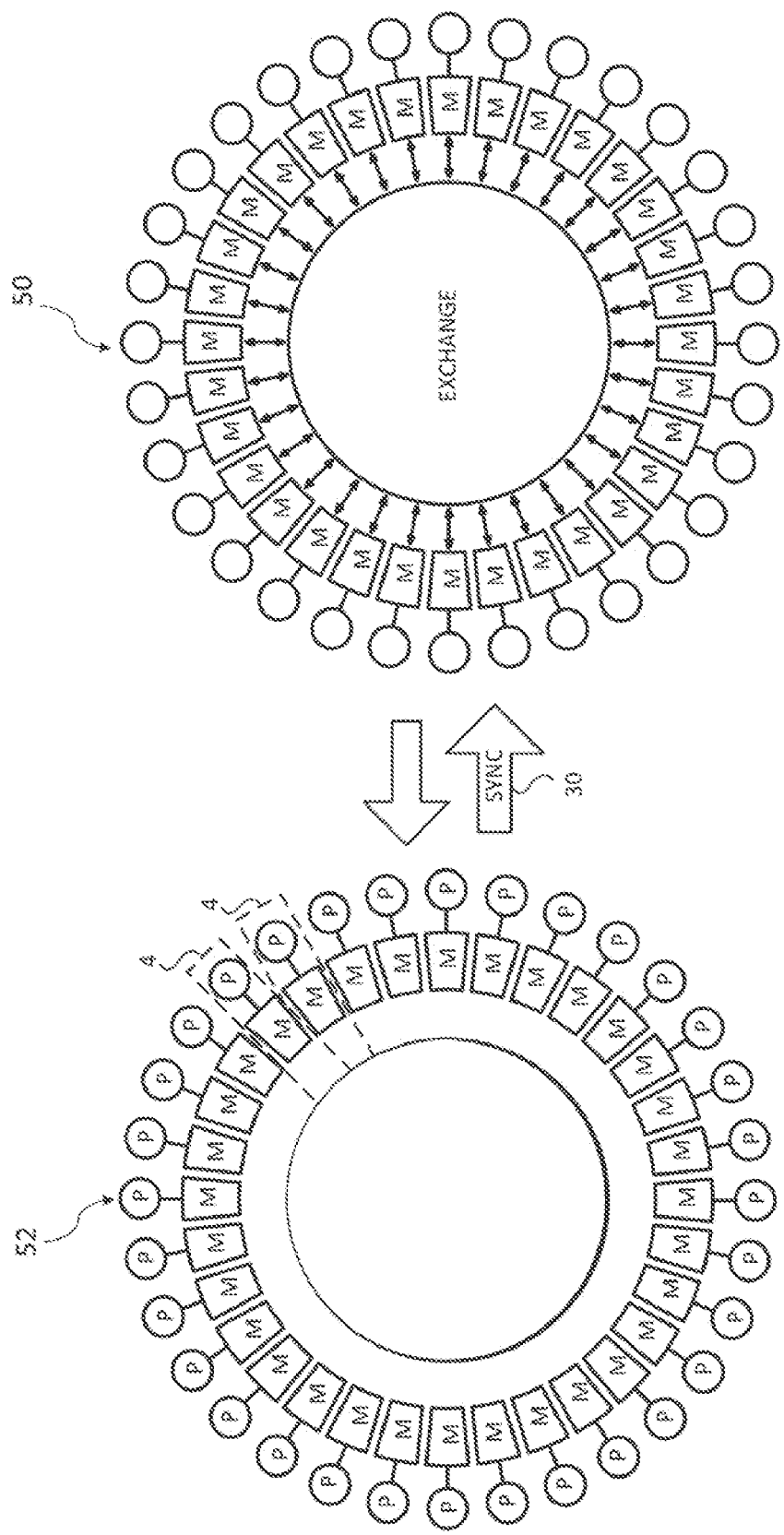
FIG. 3 is a diagram illustrating a BSP model.

As briefly mentioned above, data is exchanged between tiles in the processing unit. Each processing unit operates a Bulk Synchronous Parallel protocol, comprising a compute phase and an exchange phase. The protocol is illustrated for example in FIG. 3. The left-hand diagram in FIG. 3 represents a compute phase in which each tile 4 is in a phase where the stateful codelets execute on local memory (12, 22). Although in FIG. 3, the tiles 4 are shown arranged in a circle, this is for explanatory purposes only and does not reflect the actual architecture.

After the compute phase, there is a synchronisation denoted by arrow 30. To achieve this, a SYNC (synchronization) instruction is provided in the processor's instruction set. The SYNC instruction has the effect of causing the supervisor thread SV to wait until all currently executing workers W have exited by means of an EXIT instruction. In embodiments the SYNC instruction takes a mode as an operand (in embodiments its only operand), the mode specifying whether the SYNC is to act only locally in relation to only those worker threads running locally on the same processor module 4, e.g. same tile, or whether instead it is to apply across multiple tiles or even across multiple chips.

BSP in itself is known in the art. According to BSP, each tile 4 performs a compute phase 52 and an exchange (sometimes called communication or message-passing) phase 50 in an alternating cycle.

The compute phase and exchange phase are performed by the tile executing instructions. During the compute phase 52 each tile 4 performs one or more computation tasks locally on-tile, but does not communicate any results of these computations with any others of the tiles 4. In the exchange phase 50, each tile 4 is allowed to exchange (communicate) one or more results of the computations from the preceding compute phase to and/or from one or more others of the tiles in the group, but does not yet perform any new computations that have a potential dependency on a task performed on another tile 4 or upon which a task on another tile 4 might potentially have a dependency (it is not excluded that other operations such as internal control-related operations may be performed in the exchange phase). Further, according to the BSP principle, a barrier synchronization is placed at the juncture transitioning from the compute phases 52 into the exchange phase 50, or the juncture transitioning from the exchange phases 50 into the compute phase 52, or both. That is it say, either: (a) all tiles 4 are required to complete their respective compute phases 52 before any in the group is allowed to proceed to the next exchange phase 50, or (b) all tiles 4 in the group are required to complete their respective exchange phases 50 before any tile in the group is allowed to proceed to the next compute phase 52, or (c) both of these conditions is enforced. This sequence of exchange and compute phases may then repeat over multiple repetitions. In BSP terminology, each repetition of exchange phase and compute phase is referred to herein as a "superstep", consistent with usage in some prior descriptions of BSP. It is noted herein that the term "superstep" is sometimes used in the art to denote each of the exchange phase and compute phase.

The execution unit (EXU) of the execution stage 18 is configured so as, in response to the opcode of the SYNC instruction, when qualified by an inter-tile operand, to cause the supervisor thread in which the "SYNC chip" was executed to be paused until all the tiles 4 in the array 6 have finished running workers. This can be used to implement a barrier to the next BSP superstep, i.e. after all tiles 4 on the processing unit 2 have passed the barrier, the cross-tile program as a whole can progress to the next exchange phase 50.

Each tile 4 indicates its synchronisation state to a sync module 36. Once it has been established that each tile 4 is ready to send data, the synchronisation process causes the system to enter an exchange phase which is shown on the right-hand side of FIG. 3. In this exchange phase, data values move between tiles (in fact between the memories of tiles in a memory-to-memory data movement). In the exchange phase, there are no computations which might induce concurrency hazards between tile programs. In the exchange phase, each datum moves along the connection wires on which it exits a tile 4 from a transmitting tile 4 to one or multiple recipient tile(s) 4.

In embodiments, at each clock cycle, datum moves a certain distance along its path (store to store), in a pipelined fashion. When a datum is issued from a tile 4, it is not issued with a header identifying a recipient tile (although the datum may include a header indicating at least one direction of travel through the switching fabric 34). Instead, the recipient tile 4 knows that it will be expecting a datum from a certain transmitting tile at a certain time. Thus, the computer described herein is time deterministic. Each tile 4 operates a program which has been allocated to it by the programmer or by a compiler exercise, where the programmer or the compiler function has knowledge of what will be transmitted by a particular tile at a certain time and what needs to be received by a recipient tile at a certain time. In order to achieve this, SEND instructions are included in the local programs executed by the processor on each tile 4, where the time of execution of the SEND instruction is predetermined relative to the timing of other instructions being executed on other tiles 4 in the processing unit 2.

Each tile 4 can send and receive data from other tiles 4 of the processing unit 2 to which it belongs and can send and receive data from tiles 4 of the processing unit 2 of the other die. The mechanism by which interdie data exchange is achieved is described in more detail later, but first a discussion of how data is exchanged between tiles 4 on the same processing unit 2 is presented.

Each tile 4 is associated with its own multiplexer 210: thus, in embodiments, the processing unit 2 has 1216 such multiplexers 210. Each multiplexer 210 has 1216 inputs, each input being 32-bits wide (plus optionally some control bits). Each input is connected to a respective set of connecting wires $140_x$ in the switching fabric 34. The connecting wires $140_x$ of the switching fabric 34 are also connected to an output exchange bus 218 from each tile 4 and thus there are 1216 sets of connecting wires which, in this embodiment, extend in a direction across the processing unit 2. For ease of illustration, a single emboldened set of wires $140_{sc}$ is shown connected to the output exchange bus $218_s$, coming from a tile 4 not shown in FIG. 2, in the south array 6b.

As shown in FIG. 2, the data sent on the output exchange bus 218 of the tile 4 may be data sent by the tile 4 itself on its output wires 225. However, as will discussed in detail later, the data may also be received from a further tile 4 on another die.

This set of wires is labelled $140_x$ to indicate that it is one of a number of sets of crosswires $140_0$. $140_{1215}$. As can now be seen from FIG. 2, it will be appreciated that when the multiplexer 210 is switched to the input labelled 220$_x$ then it will connect the tile 4 shown in FIG. 2 to the crosswires 140$_x$, and thus to the output exchange bus 218$_s$ of the tile (not shown in FIG. 2) from the south array 6b. If the multiplexer 210 is controlled to switch to that input (220$_x$) at a certain time, then the datum received on the data out wires 218$_s$, which is connected to the set of connecting wire 140$_x$ will appear at the output 230 of the multiplexer 210 at a certain time. It will arrive at the tile 4 a certain delay after that, the delay depending on the distance of the multiplexer 210 from the tile 4.

As the multiplexers 210 form part of switching fabric 34, the delay from the tile 4 to the multiplexer 210 can vary depending on the location of the tile. To implement the switching, the local programs executed on the tiles include switch control instructions (PUTi) which cause a multiplexer control signal 214 to be issued to control the multiplexer 210 associated with that tile 4 to switch its input at a certain time ahead of the time at which a particular datum is expected to be received at the tile 4. In the exchange phase, multiplexers 210 are switched and packets (data) are exchanged between tiles 4 using the switching fabric 34. The switching fabric has no state—the movement of each datum is predetermined by the particular set of wires to which the input of each multiplexer 210 is switched.

The SEND instruction comprises an indication of at least one direction in which a datum will travel along the switching fabric 34 from the transmitting tile 4 to one or more receiving tiles 4. Data transmitted from a single Tile T to single T may travel in one of two fixed directions along the exchange fabric 34, with the direction dependent on the identifiers of these two communicating tile instances. The tile architecture describes the exchange direction as observed by the sender and every send instruction uses a pair of configuration flags to indicate the direction of travel (East and/or West). It is functionally valid to set both the East-Valid and West-Valid flags for every executed SEND instruction (and indeed necessary when there are 2 or more recipient tiles and those recipients require a different transfer direction). However, in the cases where all recipient tiles are strictly to the East or West of the sending tile, setting only the relevant direction flag will enable the use of power optimisations.

Figure 4:
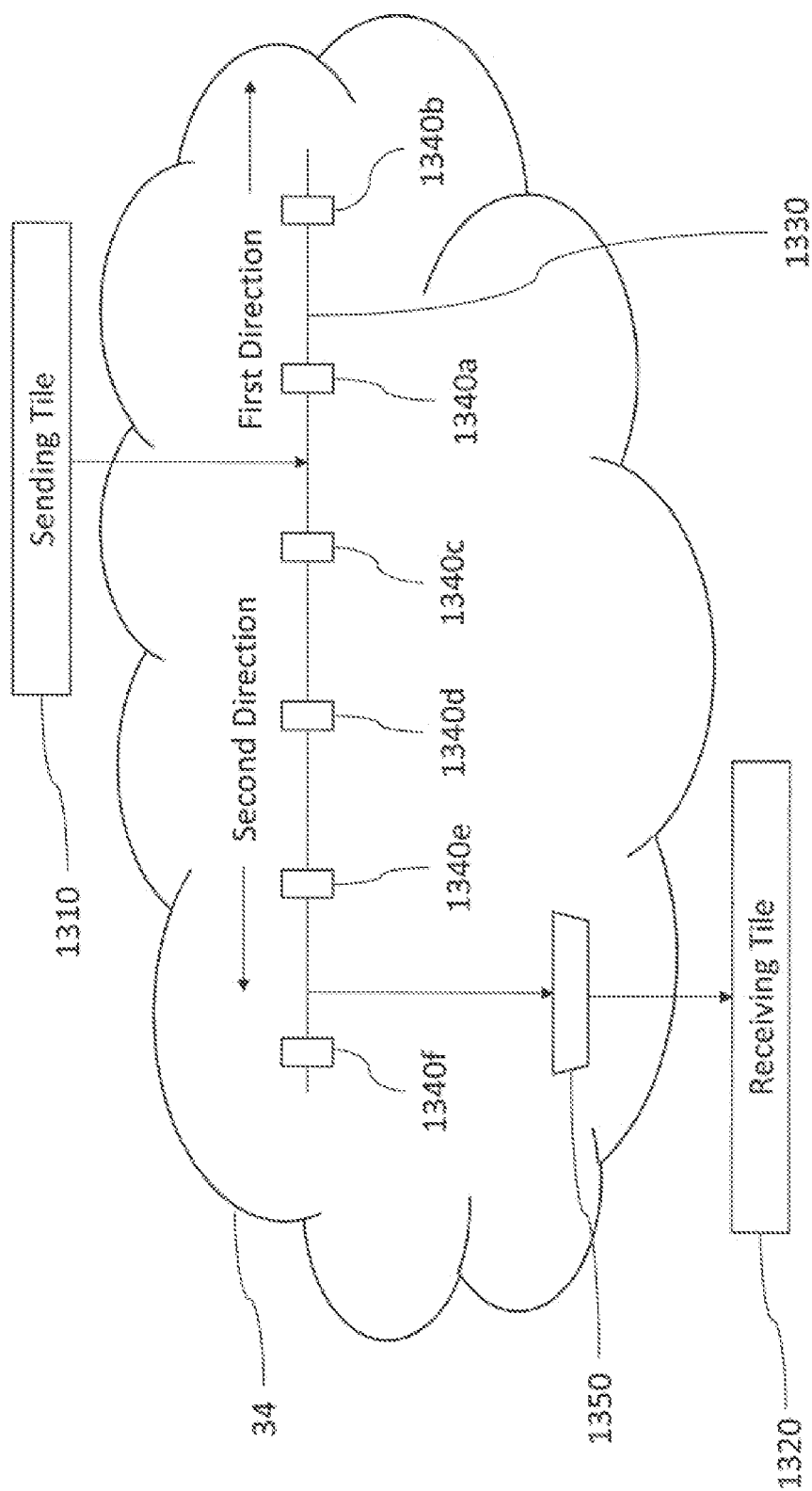
FIG. 4 is a schematic diagram showing two tiles exchanging data over a switching fabric.

Reference is made to FIG. 4, which illustrates how the indication of at least one direction may be used to control the direction of travel of a datum through the switching fabric 34.

When the processor of the sending tile 1310 executes a send instruction, an indication of the at least one direction provided by the send instruction may be inserted into a datum for transmission onto the switching fabric 34. The indication may be inserted in a header of the datum. In this example, the receiving tile 1320 is shown as being located in a second direction from the sending tile 1310. Therefore, the indication of the at least one direction comprises an indication that the datum is to be transmitted in the second direction through the switching fabric 34. Since, in this example, there is no receiving tile positioned in the first direction along the switching fabric 34 from the sending tile 1310, the indication of the at least one direction comprises an indication that the datum is not to be transmitted in the first direction through the switching fabric 34. The processor of the transmitting tile 1310 may be configured to, in response to the execution of the send instruction, transmit at a transmit time, the datum onto a connection wire 1330 of the switching fabric 34. On the connection wire 1330, are a series of temporary stores 1340a, 1340b, 1340c, 1340d, 1340e, 1340f, e.g. latches or flip flops which hold the datum for a clock cycle before releasing it to the next store. Each of the temporary stores may include or be associated with suitable processing circuitry to determine whether or not the datum should be transmitted on down the connection wire 1330 past the temporary store.

When the datum reaches one of the temporary stores, the indication of the at least one direction is evaluated to determine whether the datum is permitted to be transmitted through the temporary store or whether it should be blocked/prevented from being transmitted further along the switching fabric. For example, when the datum on the connection wire 1330 reaches the temporary store 1340a, the indication as to whether or not the datum is for transmission in the first direction is checked. Since, in this example, the datum is for transmission in the second direction only, for delivery to the receiving tile 1320, the datum is prevented from passing beyond the temporary store 1340a.

On the other hand, when the datum reaches the temporary store 1340c, the indication as to whether or not the datum is for transmission in the second direction is checked. In this case, since this indication is positive, the datum is transmitted through the temporary store 1340c along the connection wire 1330. The same check may be carried out and conclusion reached at the temporary stores 1340d, 1340e, and 1340f. This ensures that the datum will reach the receiving tile 1320 via the input multiplexer 1350 of that tile 1320.

Therefore, arrangement of the switching fabric 34 is configured to only pass datums along the one or more directions indicated for transmission in the datum and to prevent the transmission of the datum over the switching fabric 34 in directions not indicated for transmission in the datum. This has the advantage of enabling power optimisation by reducing the transmissions of datums to parts of the switching fabric 34 where there are no tiles that are destined to receive those particular datums. Directional opposites need not apply to the tile exchange directions. For example, if the tile 1310 is sending all of its data for delivery to the tile 1320 having indicators that transmission is allowed in the second direction, but not allowed in the first direction, this does not imply that, when the tile 1320 sends data for delivery to the tile 1310, that this data must include indicators that the transmission is allowed in the first direction, but not allowed in the second direction. It could, for example, be the case, that the tile 1320 transmits to the tile 1310 datums having indicators that transmission should take place in both the second direction and the first direction on the switching fabric.

One mechanism by which synchronisation between tiles 4 is achieved is the SYNC instruction mentioned above. Other mechanisms may be utilised: what is important is that all tiles can be synchronised between a compute phase of the processing unit and an exchange phase of the processing unit (FIG. 3). The SYNC instruction triggers the following functionality to be triggered in dedicated synchronization logic on the tile 4, and in the synchronization controller 36. The sync controller 36 may be implemented in the hardware interconnect 34 or, as shown, in a separate on chip module. This functionality of both the on-tile sync logic and the synchronization controller 36 is implemented in dedicated hardware circuitry such that, once the SYNC instruction is executed, the rest of the functionality proceeds without further instructions being executed to do so.

Firstly, the on-tile sync logic causes the instruction issue for the supervisor on the tile 4 in question to automatically pause (causes the fetch stage 14 and scheduler 24 to suspend issuing instructions of the supervisor). Once all the outstanding worker threads on the local tile 4 have performed an EXIT, then the sync logic automatically sends a synchronization request "sync_req" to the synchronization controller 36. The local tile 4 then continues to wait with the supervisor instruction issue paused. A similar process is also implemented on each of the other tiles 4 in the array 6 (each comprising its own instance of the sync logic). Thus at some point, once all the final workers in the current compute phase 52 have EXITed on all the tiles 4 in the array 6, the synchronization controller 36 will have received a respective synchronization request (sync_req) from all the tiles 4 in the array 6. Only then, in response to receiving the sync_req from every tile 4 in the array 6 of the same processing unit 2, the synchronization controller 36 sends a synchronization acknowledgement signal "sync_ack" back to the sync logic on each of the tiles 4. Up until this point, each of the tiles 4 has had its supervisor instruction issue paused waiting for the synchronization acknowledgment signal (sync_ack). Upon receiving the sync_ack signal, the sync logic in the tile 4 automatically unpauses the supervisor instruction issue for the respective supervisor thread on that tile 4. The supervisor is then free to proceed with exchanging data with other tiles 4 in via the interconnect 34 in a subsequent exchange phase 50.

Preferably the sycn_req and sync_ack signals are transmitted and received to and from the synchronization controller 36, respectively, via one or more dedicated sync wires connecting each tile 4 to the synchronization controller 36 in the interconnect 34.

Figure 5:
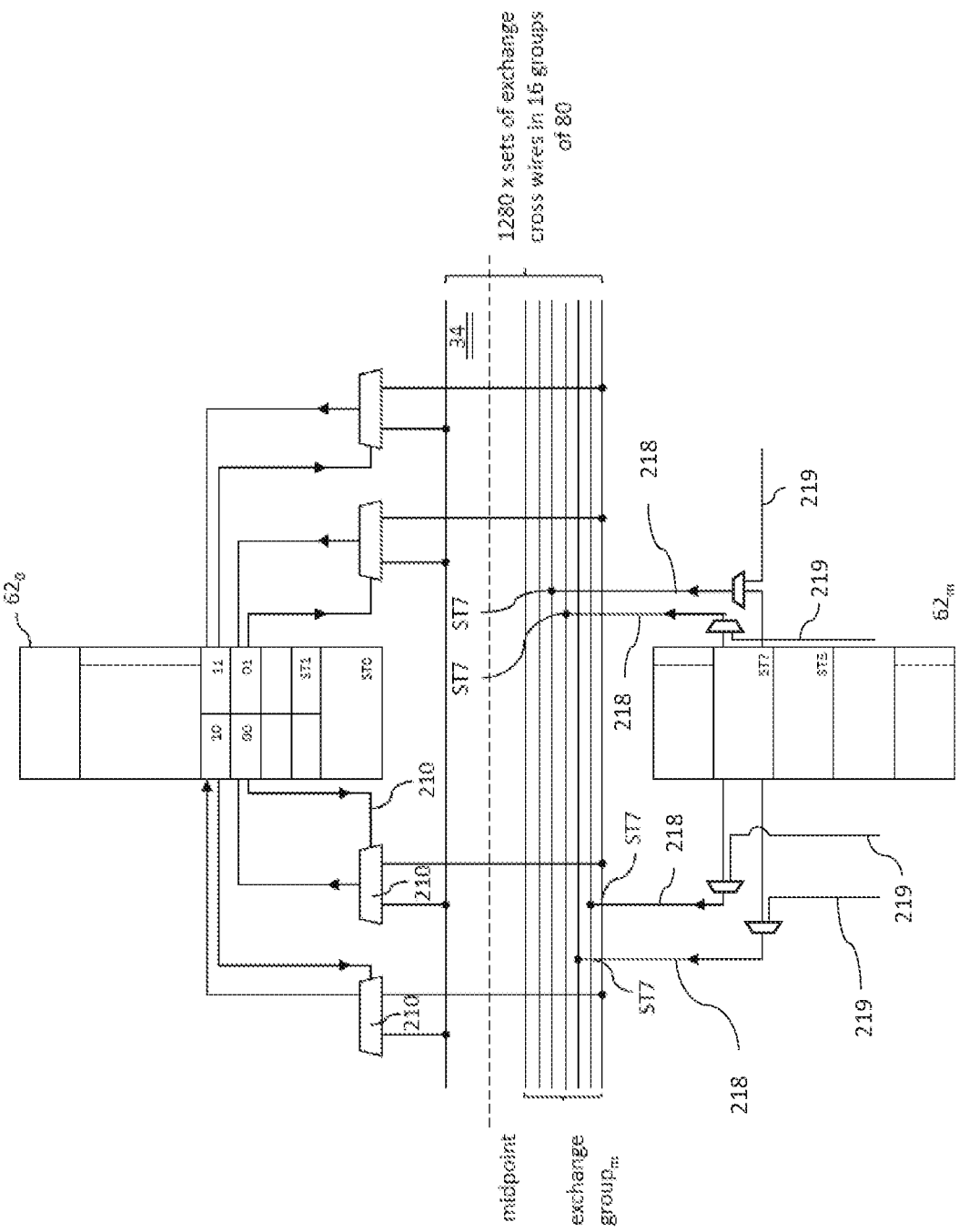
FIG. 5 is a schematic diagram shown the arrangement of tiles into columns of supertiles.

To better understand the layout of the tiles 4 of the processing unit 2, reference is made to FIG. 5, which illustrates an example of the layout of columns in the die to which the processing unit 2 belongs. Each tile 4 is part of a set of four tiles, referred to as a supertile 61. Each supertile 61 comprises four tiles 4. For simplicity, only a few of the supertiles 61 shown in FIG. 5 are shown divided into their constituent tiles.

Each supertile 61 is part of a subsystem of tiles 4 referred to as a column $62_n$. Therefore, each tile 4 is also part of a column $62_n$. In one embodiment, each column 62 comprises twenty supertiles 61, numbered $ST_0$ to $St_1$ (80 tiles in total). The columns $62_n$ are arranged horizontally along the die in one dimension, with the switching fabric 34 being arranged horizontally along the die in another dimension.

As described above, each tile 4 has a 32 bit input connection 217, and 32 bit output exchange bus 218. As noted, the tile 4 knows (because it is defined in the sequence of instructions compiled for the tile) that it will be expecting a datum from a certain transmitting tile at a certain time, and executes a instruction, to control the multiplexer 210 to switch at a certain time to the input connected to the set of connecting wires 140 which is connected to the output exchange bus 218 of the sending tile 4. This ensures that the datum will appear at the output 230 of the multiplexer 210 at the time that the receiving tile 4 is expecting to receive it.

The multiplexer 210 receives a multiplexor control signal on the control line 214 which identifies a unique tile identifier indicating where that multiplexor should 'point'. That is, to which set of cross wires on the exchange 34 should that multiplexer connect in order to 'listen to' the tile 4 from which a transmission is expected at that time.

In the arrangement described herein, the multiplexer for the tiles 4 in each column 62 is connected to a bundle of 40 sets of the exchange cross wires. Each set permits a 32 bit datum to be conveyed over the exchange. As further shown in FIG. 5, the sets are divided into two, which are referred to as East and West (depending on which side of the column the multiplexers would be connected to). FIG. 5 shows two multiplexers connected to supertile ST2 on the east side of the column, and two multiplexers connected to supertile ST3 on the East side of the column. On the West side of the column two multiplexers are shown connected to two tiles in supertile ST2. For the sake of clarity, no other multiplexers or connection lines are shown in FIG. 5, but it will be appreciated that there are two multiplexers 210 for each supertile on each side of the column, making a total of twenty multiplexors 210 on the east side and twenty multiplexors 210 on the west side. Each multiplexor should be capable of connecting to any of the 1280 sets of exchange cross wires in the exchange fabric 34. In some processing units 2, only 1216 exchange cross wires are required, but in others all 1280 sets may be active.

As noted earlier, in addition to the exchange of data between tiles in the processing unit 2 that is implemented on a die, data exchange may also take place between tiles on different die.

FIG. 2 shows the connection structure of the tile 4, which enables both intradie and interdie communication. Each tile 4 has the following interfaces:

an exin interface 224, which passes data from the switching fabric 34 to the tile 4;

an exout interface 226, which passes data from the tile 4 to the switching fabric 34 of the processing unit 2 to which the tile 4 belongs;

an exmux interface 228 which passes the control mux signal 214 (mux-select) from the tile 4 to its input multiplexer 210;

a interdie data connection interface 221 for sending data to a tile 4 of a processing unit 2 on a different die over interdie data connection wires 219a; and a interdie control connection interface 222 for transmitting a signal over interdie control connection wires 223a to control a multiplexer of the tile 4 on the other die to which the data is sent over interdie data connection wires 219a.

Interdie data connection wires 219 are also shown in FIG. 5. Each of these connects a tile 4 on the other die to one of the output exchange buses 218 shown in FIG. 5. The interdie data connection wires 219 enable a tile 4 on the other die to send data via the exchange fabric 34 shown in FIG. 5. Each of the wires 219 is a vertical connection that is connected to a tile 4 on the other die that is positioned vertically above the tile 4 having the exchange bus 218 to which it connects. These two tiles 4 are said to be vertical neighbours.

Figure 6:
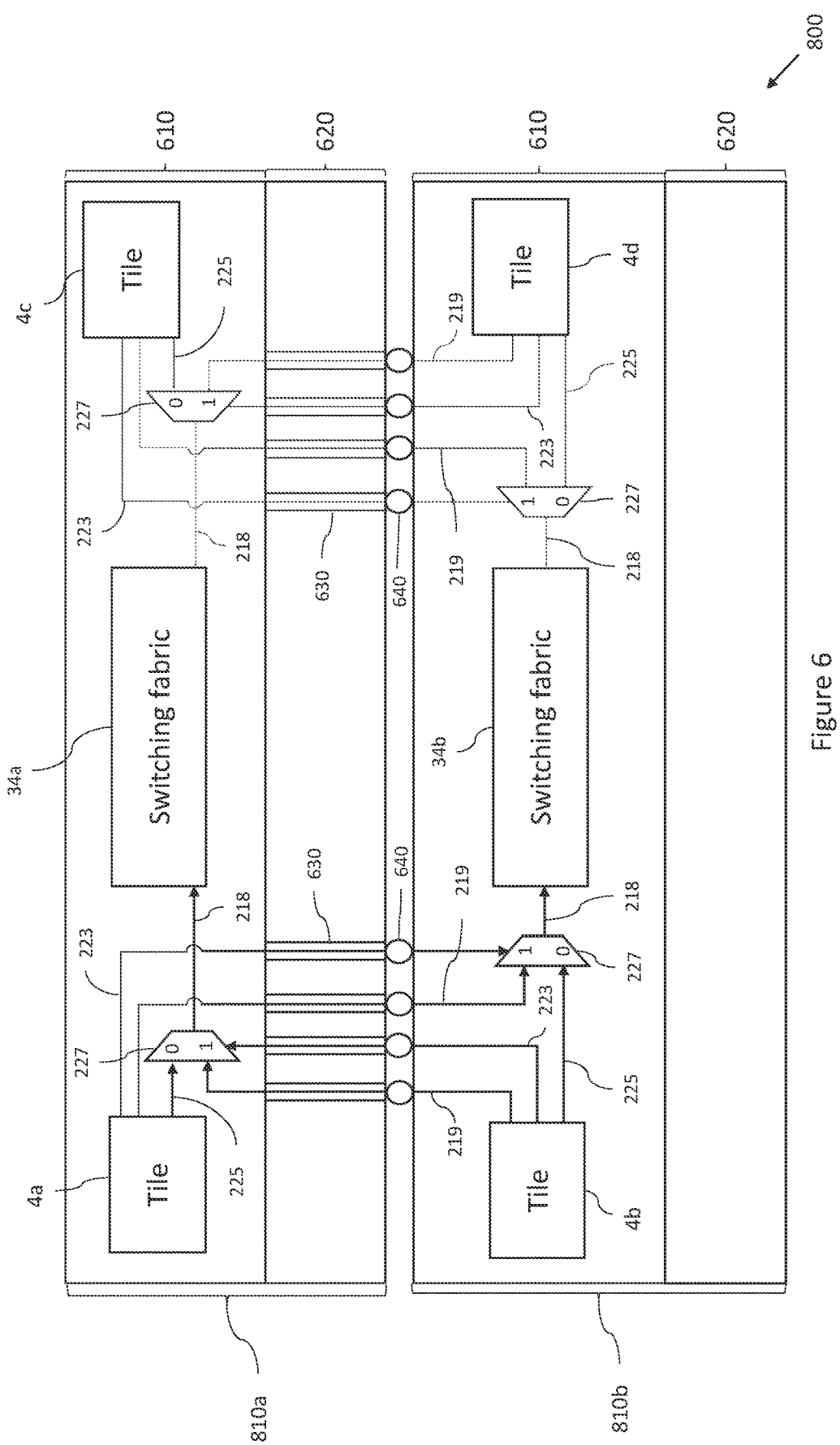
FIG. 6 is a schematic diagram illustrating an integrated circuit device comprising two stacked die.

Reference is made to FIG. 6, which illustrates an example of a stacked device 800 according to example embodiments. The stacked device 800 comprises a first die 810a and a second die 810b. Each of the die 810a, 810b comprises a metal layer portion 610 comprising the logic (including the processing unit 2 as discussed above) of the respective die. Additionally, each of the die 810a, 810b comprises a semiconductor substrate 620 on which the logic is constructed.

Each of the first die 810a and the second die 810b comprise identical versions of the processing unit 2 discussed above. In addition to the processing unit 2 discussed above, each of the die 810a, 810b comprises identical system on chip circuitry providing supporting functions to the processing unit 2. Although the two die 810a, 810b contain the same logic, they may differ in the thickness of their silicon substrate 620.

Although, for simplification, only a small number of example tiles 4 are shown in FIG. 6, each of the first die 810a and the second die 810b comprise all of the tiles 4 of the processing unit 2 as described above. Each of the tiles 4 in the first die 810a and second die 810b may operate in the same manner as the example tiles shown in FIG. 6. Both the first die 810a and the second die 810b comprise a switching fabric 34a, 34b as described above.

In the example shown in FIG. 6, the tile 4a corresponds to the tile 4b. In other words, the tile 4a and the tile 4b are vertical neighbours and occupy the same position in their respective die. Similarly, the tile 4c corresponds to the tile 4d. In other words, the tile 4c and the tile 4d are vertical neighbours and occupy the same position in their respective die. The tiles 4a, 4c each comprise a set of output wires 225 for sending data packets via an exchange bus 218 to the switching fabric 34a so as to send data packets to tiles 4 of their own die 810a. Likewise, the tiles 4b, 4d each comprise a set of output wires 225 for sending data packets via an exchange bus 218 to the switching fabric 34b so as to send data packets to tiles 4 of their own die 810b.

In addition to the wires for sending and receiving data packets from tiles 4 of their own die 810, each of the tiles 4 is associated with two sets of interdie data connection wires 219 for sending and receiving data packets with their corresponding tile 4 on the other of the two die 810a, 810b. For example, the tile 4a has an interdie data connection bus 219 enabling it to send data packets via the output exchange bus 218 of the tile 4b. The tile 4a is able to send data packets along this output exchange bus 218 to the switching fabric 34b to send data to a tile 4 on die 810b. Similarly, the tile 4b has an interdie data connection bus 219 enabling it to send data packets via the output exchange bus 218 of the tile 4a. The tile 4b is able to send data packets along this output exchange bus 218 to the switching fabric 34a to send data to a tile 4 on die 810a. The same interdie data connection wires 219 are present between tile 4c and tile 4d.

A multiplexer 227 is provided for each of the tiles 4 in both die. Each such multiplexer 227 has as its output, the exchange output bus 218 of its associated tile 4. In dependence upon a control signal supplied to the multiplexer 227, the multiplexer 227 may supply either a data packet output from its associated tile 4 or data output by its associated tile's corresponding tile 4 on the other of the two die 810a, 810b. The control signal that controls each multiplexer 227 is supplied by this corresponding tile 4. For example, suppose that tile 4a has data to send to a tile 4 on die 810b. The tile 4a asserts a signal on wire 223 to control the multiplexer 227 associated with tile 4b so as to select the input connected to the interdie connection wire 219 of tile 4a. At the same time, tile 4a sends the data packet via its set of wires 219 to the selected input of the multiplexer 227. When the data packet arrives at the multiplexer 227, the data is output onto the output exchange bus 218 associated with the tile 4b and thereby delivered over the switching fabric 34b to one or more of the tiles 4 on die 810b.

In the case that, at a particular time, instead of tile 4a having data to send over the switching fabric 34b, the tile 4b has data to send over the switching fabric 34b, it is arranged that the tile 4a does not assert the control signal to the multiplexer 227 to select the input on wires 219. The tile 4b may then send a data packet on its set of output wires 225 to the other input of the multiplexer 227 to be sent via the output exchange bus 218 to be delivered over switching fabric 34b to a tile 4 on the die 810b. Since the code running on each of the tiles 4 in both die 810a, 810b is generated together at compile time, it may be arranged that tile 4a will not assert the control signal on wire 223 when tile 4b has data to send via its associated exchange bus 218.

It would be appreciated that, although it is described herein that a tile 4 asserts a signal on wire 223 to control the multiplexer 227 to output an input received on interdie connection wire 219, it could equally be the case that the tile 4 asserts a signal to control the multiplexer 227 to output an input received on output wires 225 instead and deasserts the signal to select the other input.

Part of the interdie data connections 219 and the control signal lines 223 are implemented in connections through the metal layers 610 of the die 810a, 810b. Additionally, part of the interdie data connections 219 and the select signal lines 223 are implemented in connections through the substrate 620 in the die 810a. The connections through the substrate 620 take the form of backside through silicon vias 630. At the interface between the two die 810a, 810b, each of the through silicon vias 630 connects to metal contacts on the top of the die 810b via bonding contacts 640, which form part of the connections for transferring the associated signals. Although, for simplification, FIG. 6 shows only a single through silicon via 630 for transferring the interdie connections 219 since, in embodiments, each interdie connection bus 219 comprises a group of wires for transferring the bits of a data packet in parallel, a group of through silicon vias 630 may be used for each interdie data connection 219.

Referring back to FIG. 2, the two sets of interdie data wires 219a, 219b for allowing the tile 4 and its corresponding tile 4 to send interdie data are shown. Additionally, the two control signal wires 223a, 223b for allowing the tile 4 and its corresponding tile 4 to control each other's multiplexer 227 are shown. The tile 4 shown in FIG. 2 may be any of the tiles 4a, 4b, 4c, 4d shown in FIG. 6.

When sending a data packet to a tile 4 on the other die, the tile 4 sends the data packet to the output exchange bus 218 of the corresponding tile 4 via connection 219a. As already described in detail, the tile 4 may also send a data packet via output wires 225 to send data via its own exchange bus 218 to a tile 4 on its own die. The selection of which of the connections 219a, 225 via which data is sent is made by the processor logic of the tile 4. More specifically, the selection of which of the connections 219a, 225 to send a data packet may be dependent upon an operand of the send instruction as specified in the complied code held in the memory of the tile 4.

In some embodiments, the tile 4 may be operable to multicast data to more than one tile 4, with different ones of the tiles 4 to which data is being multicast belonging to different die. In this case, the tile 4 may send a data packet via connection 219a to one or more tiles 4 on the other die and may send the same data packet via exchange bus 218 to one or more tiles 4 on its own die. Such a multicast operation could be performed by the operand of the send instruction causing the tile 4 to send copies of the data packet via both of the interfaces 221, 226.

Referring back to FIG. 6, it is noted that pairs of corresponding tiles 4a, 4b may be prevented from sending data packets at the same time to tiles 4 on the same die 810a, 810b, so as to avoid conflict on the relevant output exchange bus 218 and in the relevant switching fabric 34. For example, if the tile 4a were to execute a send instruction to send a data packet via its output exchange bus 218 and the tile 4b were to execute a send instruction to send a data packet via the output exchange bus 218 of tile 4a. If the timing of the execution of the send instructions is such that data collision between these two data packets were to occur on the exchange bus 218 of tile 4a, then the execution of these send instructions is not permitted. As will be described in more detail, the exchange scheduling performed by the compiler, which determines when each of the send instructions by the tiles 4 of both die 810a, 810b, are executed is performed so as to prevent such conflict in the sending of the data from pairs of corresponding tiles 4.

Therefore, pairs of corresponding tiles 4 are programmed so as not to execute send instructions to send data over the same output exchange bus 218 at the same time. This presents a constraint on the sending of data to tiles 4 on the same die by pairs of corresponding tiles 4. However, pairs of tiles 4 may each still send data via the output exchange bus 218 of their associated tile 4 at the same time. For example, tile 4a may output a data packet via wires 219 to be transmitted via output exchange bus 218 associated with tile 4b. Tile 4b may at the same time send data via wire 219 to be transmitted via output exchange bus 218 associated with tile 4a. To achieve this, tile 4a executes a send instruction to send a data packet via its interdie connection 219 to the exchange bus 218 of tile 4b so as to send data via switching fabric 34b to a tile 4 on die 810b. In the same clock cycle, tile 4b also executes a send instruction to send a data packet via its interdie connection 219 to the exchange bus 218 of tile 4a so as to send data via switching fabric 34a to a tile 4 on die 810a. Thus, each of tiles 4a, 4b may transmit to the tiles 4 on their opposing die at the same time.

In order to make efficient use of the wiring available for exchanging data packets between the tiles 4 in the stacked device 800, the exchange of data may be divided into two distinct exchange periods. There may be an intradie exchange period, during which tiles 4 in the device 800 send data to other tiles 4 on their own die, without sending data to tiles 4 on the other die. Additionally, there may be an interdie exchange period, during which tiles 4 in the device 800 send data to tiles 4 on the other die of the device 800, without sending data to tiles 4 on their own die.

Figure 9:
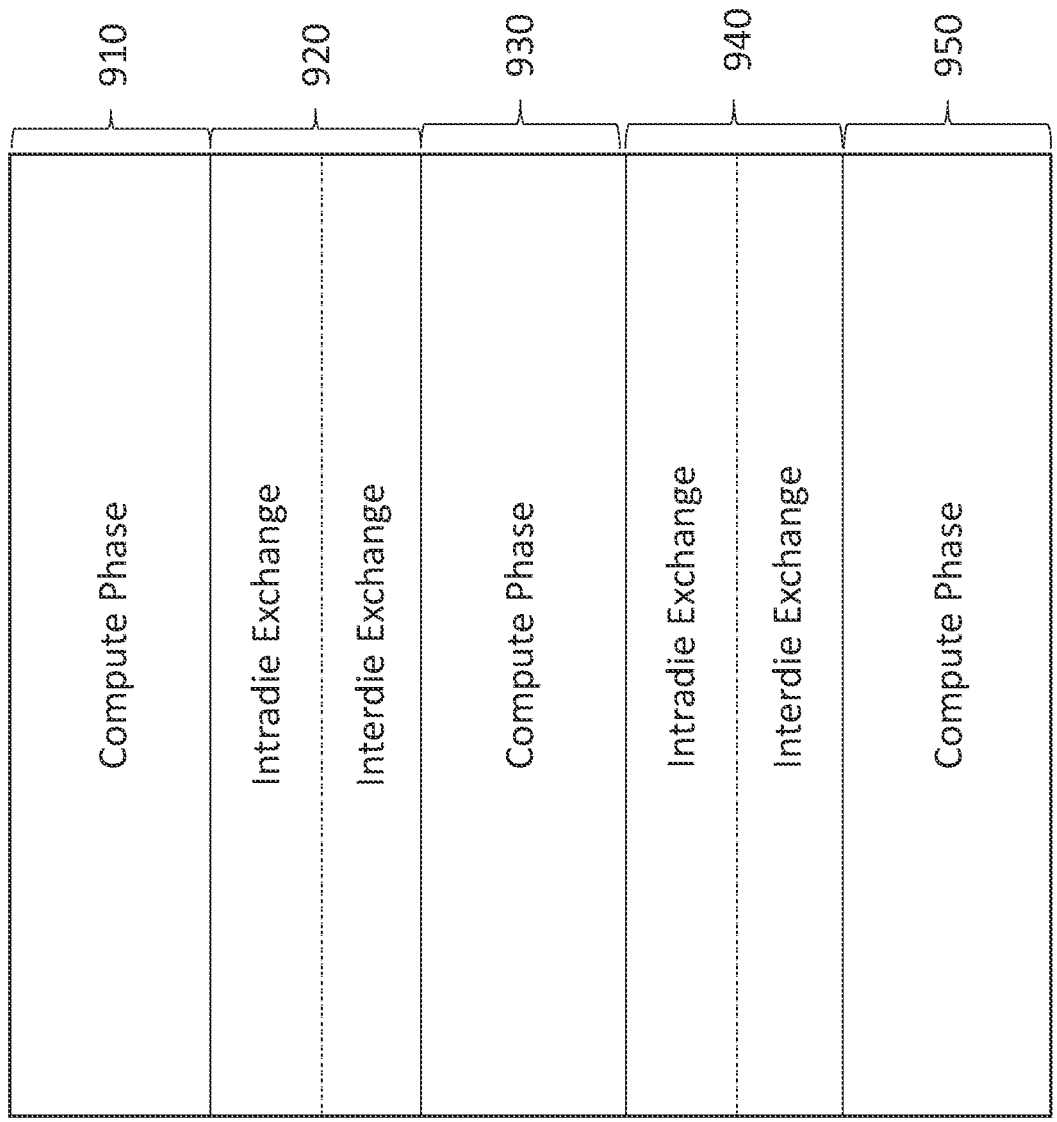
FIG. 9 illustrates a sequence of compute and exchange phases in which the stacked integrated circuit device may participate.

Reference is made to FIG. 9, which illustrates how the different exchange periods may fit into the BSP model described. As shown, the device 800 may operate in a compute phase 910 during which the tiles 4 perform their computations on data to generate results. Following this, the device 800 may operate in an exchange phase 920, during which the tiles 4 exchange their data with one another. The exchange phase 920 is divided into an intradie exchange period and an interdie exchange period as described. Following this exchange phase 920, the device 800 may move through further compute phases 930, 950 and an exchange phase 940 as shown.

When sending data between tiles 4 (either on the same die or on different die), in order to ensure that each individual tile 4 executes send instructions and switch control instructions at appropriate times to transmit and receive the correct data, exchange scheduling requirements need to be met by the programmer or compiler that allocates individual programs to the individual tiles in the computer. The scheduling function is carried out by an exchange scheduler which needs to be aware of the certain exchange timing (BNET) parameters. In order to understand the parameters, reference is made to FIG. 7, which illustrates how a tile $4_{T1}$ may send data to a tile $4_R$ (where both tile $4_{T1}$ and tile $4_R$ are part of a first die) and how a $4_{T2}$ may send data to the $R_R$ (where tile $4_{T2}$ belongs to a second die).

Figure 7:
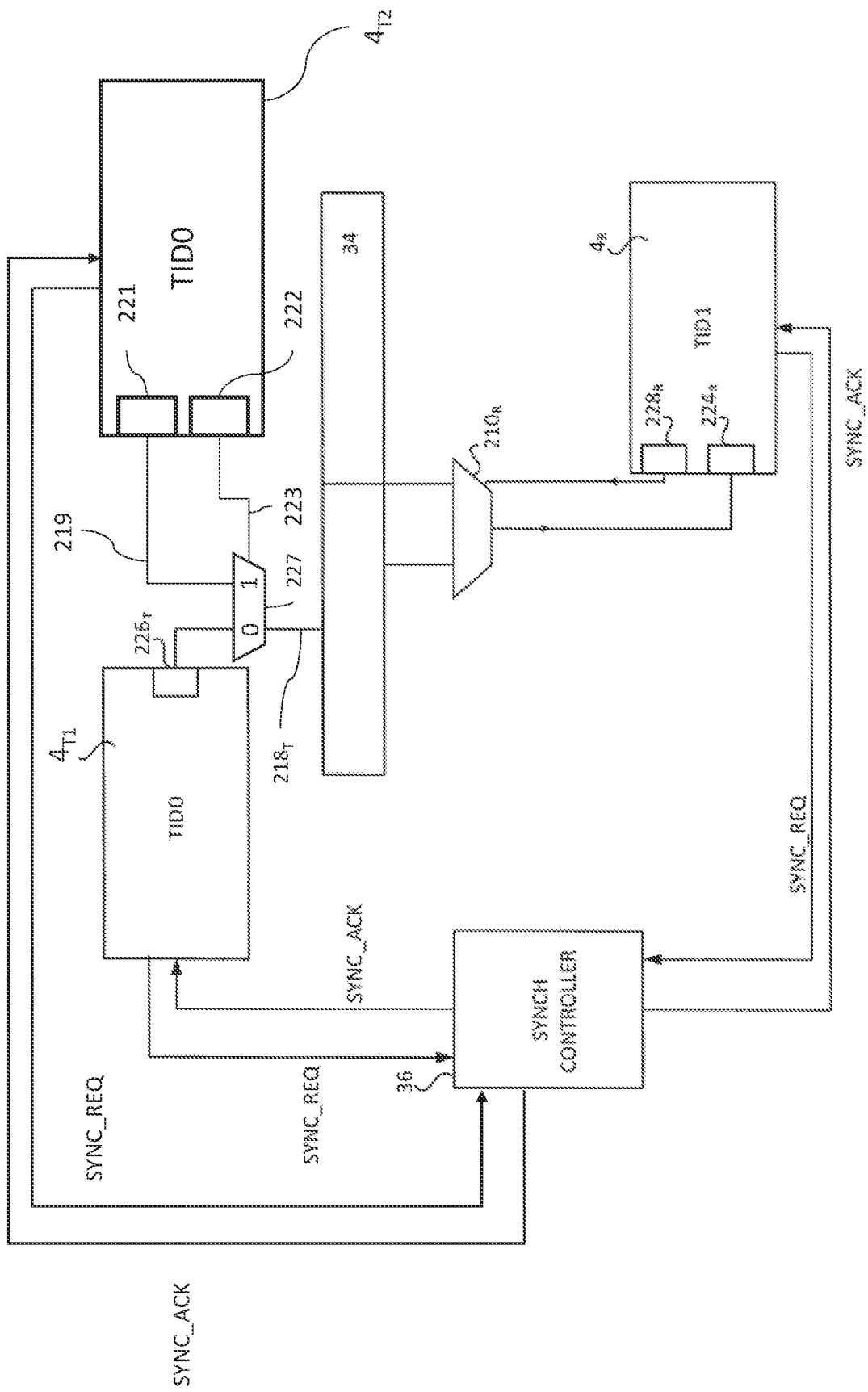
FIG. 7 illustrates the different paths via which signals and data are exchanged in order to achieve time deterministic exchange.

A synch controller 36 is shown in FIG. 7. This synch controller 36 belongs to the same die as the tiles $4_{T1}$ and $4_R$. As noted earlier, the synch controller 36 receives and acknowledges sync requests received from tiles 4 of its associated processing unit 2 when those tiles 4 reach a sync barrier. In the case that a sync takes place between tiles on different die, there are two synch controllers 36 that could be involved in the sync, one on each die. In this case, one of the synch controllers 36 serves as a master synch controller 36, which receives sync requests from tiles 4 on the other die as well as from tiles 4 on its own die. For example, FIG. 7 shows the tile $4_{T2}$ sending a sync request to synch controller 36. These sync requests sent from the other die to the synch controller 36 may be sent directly from each of the tiles 4 on the other die via dedicated interdie sync wires between those tiles 4 and the synch controller 36. In this case, the sync controller 36 transmits the sync acknowledgments to each of the tiles 4 on the other die over the dedicated interdie sync wiring. In this example, the synch controller 36 on the other die (not shown in FIG. 7) may be disabled.

First, the scheduling requirements for sending data between tiles (e.g. between tile $4_{T1}$ and tile $4_R$) on the same die are described. The differences in the scheduling requirements when data is sent between tiles (e.g. between tile $4_{T2}$ and tile $4_R$) on different die is then described.

From the point at which the synch controller 36 issues sync acknowledgments to the tiles 4 of the processing unit 2 to initiate the exchange phase, the following delays must be taken into consideration when sending data between tiles 4 of the same processing unit 2:

I. The relative SYNC acknowledgement delay.
II. The exchange mux control loop delay.
III. The tile to tile exchange delay, BNET_TT.
IV. The exchange traffic memory pointer update delay, BNET_MMP( ).

Each of these delays for intradie exchange will now be discussed in detail.

I. The relative SYNC acknowledgement delay of each tile, BNET_RSAK (TID). TID is the tile identifier held in a TILE_ID register described later. This is a number of cycles always greater than or equal to 0 indicating when each tile 4 receives the ack signal from the sync controller 36 relative to the earliest receiving tile 4. This can be calculated from the tile ID, noting that the tile ID indicates the particular location in the processing unit 2 of that tile 4, and therefore reflects the physical distances. Although shown only schematically and not to scale, the tile $4_{T1}$ is indicated closer to the sync controller 36 and the tile $4_R$ is indicated being further away, with the consequence that the sync acknowledgement delay will be shorter to the tile $4_{T1}$ than for the tile $4_R$. A particular value will be associated with each tile 4 in the processing unit 2 for the sync acknowledgement delay. These values can be held for example in a delay table, or can be calculated on the fly each time based on the tile ID.

II. The exchange mux control loop delay, BNET_MXP (TID of receiving tile). This is the number of cycles between issuing an instruction (PUTi-MUXptr) that changes a tile's input mux selection and the earliest point at which the same tile could issue a (hypothetical) load instruction for exchange data stored in memory as a result of the new mux selection. Looking at FIG. 7, this delay comprises the delay of the control signal getting from the exmux interface $228_R$ of recipient tile $4_R$ to its multiplexer $210_R$ and the length of the line from the output of the multiplexer to the data input exin interface 224.

III. The tile to tile exchange delay, BNET_TT (TID of sending tile, TID of receiving tile). This is the number of cycles between a send instruction being issued on one tile and the earliest point at which the receiving tile could issue a (hypothetical) load instruction pointing to the sent value in its own memory. This has been determined from the tile IDs of the sending and receiving tiles, either by accessing a table such as has already been discussed, or by calculation. Looking again at FIG. 7, this delay comprises the time taken for data to travel from transmit tile $4_{T1}$ from its ex_out interface $226_T$ to the switching fabric 34 along its output wires 225 and exchange bus $218_T$ and then via the input mux $210_R$ at the receiving tile $4_R$ to the ex_in interface $224_R$ of the receiving tile $4_R$.

IV. The exchange traffic memory pointer update delay, BNET_MMP( ). This is the number of cycles between issuing an instruction (PUTi-MEMptr) that changes a tile's exchange input traffic memory pointer and the earliest point at which that same tile could issue a (hypothetical) load instruction for exchange data stored in memory as a result of the new pointer. This is a small, fixed number of cycles. The memory pointer has not be previously discussed, but is shown in FIG. 2 referenced 232. It acts as a pointer into the data memory 202 and indicates where incoming data from the ex_in interface 224 is to be stored.

When data is sent from a tile $4_{T2}$ to a receiving tile $4_R$, the same delays from the point at which the master synch controller 36 issues sync acknowledgments to initiate the exchange phase also apply. There are, however, differences in the way that the "I. The relative SYNC acknowledgement delay" and the "III. The tile to tile exchange delay, BNET_TT" are calculated.

Regarding the relative sync acknowledgment, the additional time required to propagate the sync acknowledgment from the master synch controller 36 to the other die is also taken into consideration by the exchange scheduler.

Regarding the tile to tile exchange delay, the component of the time taken for a data packet to reach the switching fabric 34 along the output wires 225 and exchange bus $218_T$ of a tile 4 is replaced with the time taken for data to travel from transmit tile $4_{T2}$ from its interface 221 to the switching fabric 34 along its interdie data connection wires 219 and exchange bus 218. In other words, the time of travel along output wires 225 to multiplexer 227 is replaced with the time of travel along interdie data connections wires 219 to multiplexer 227.

The exchange scheduling is performed by the compiler 70, which compiles the code to run on each of the tiles 4. Local programs 72 (a local program 72 is compiled for each tile 4) are compiled so as to execute each of the send and switch control instructions at the appropriate clock cycles in accordance with the determined timing parameters so as to implement the time deterministic exchange both between tiles 4 on the same die and between tiles 4 on different die.

Figure 8:
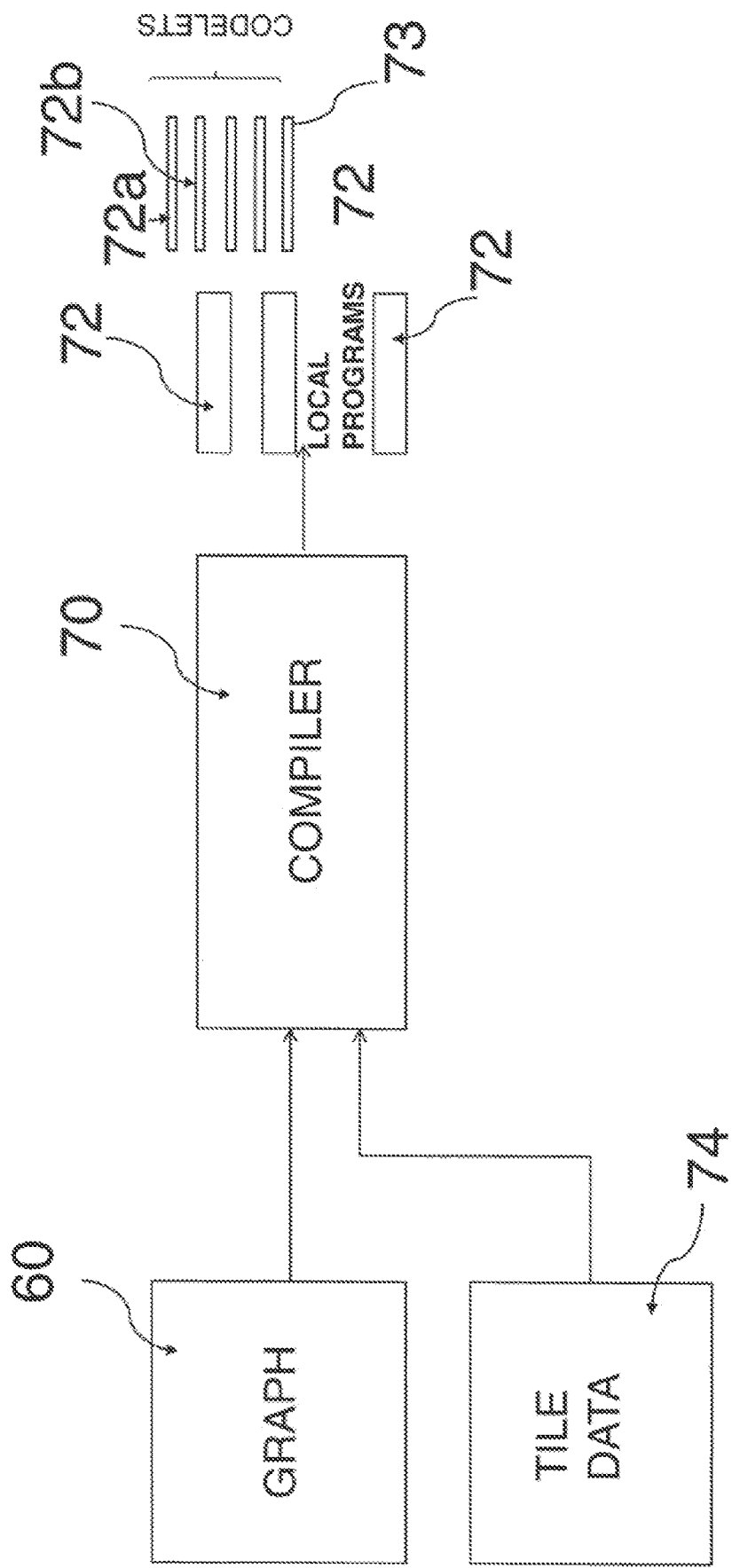
FIG. 8 is a schematic architecture illustrating operation of a compiler for generating time deterministic programs.

FIG. 8 is a schematic diagram illustrating the function of a compiler 70. The compiler 70 produces code to run on all of the tiles 4 of a computer, the "computer" including the stacked device 800 described. The compiler 70 receives such a graph 60 and compiles the functions in the graph 60 into a multiplicity of codelets, which are contained into local programs labelled 72 in FIG. 7. Each local program 72 is designed to be loaded into a particular tile 4 of the computer. Each program comprises one or more codelets forming worker threads 72a, 72b . . . plus a supervisor sub-program 73 each formed of a sequence of instructions. The compiler generates the programs such that they are linked to each other in time, which is they are time deterministic. In order to do this the compiler accesses tile data 74 which includes the tile identifiers described earlier which are indicative of the location of the tiles and therefore the delays which the compiler needs to understand in order to generate the local programs. The delays have already been mentioned above, and can be computed based on the tile data 74. Alternatively, the tile data 74 can incorporate a data structure in which these delays are available through a lookup table. The supervisor program comprises exchange code which manages the exchange of data in the exchange phase.

Figure 12:
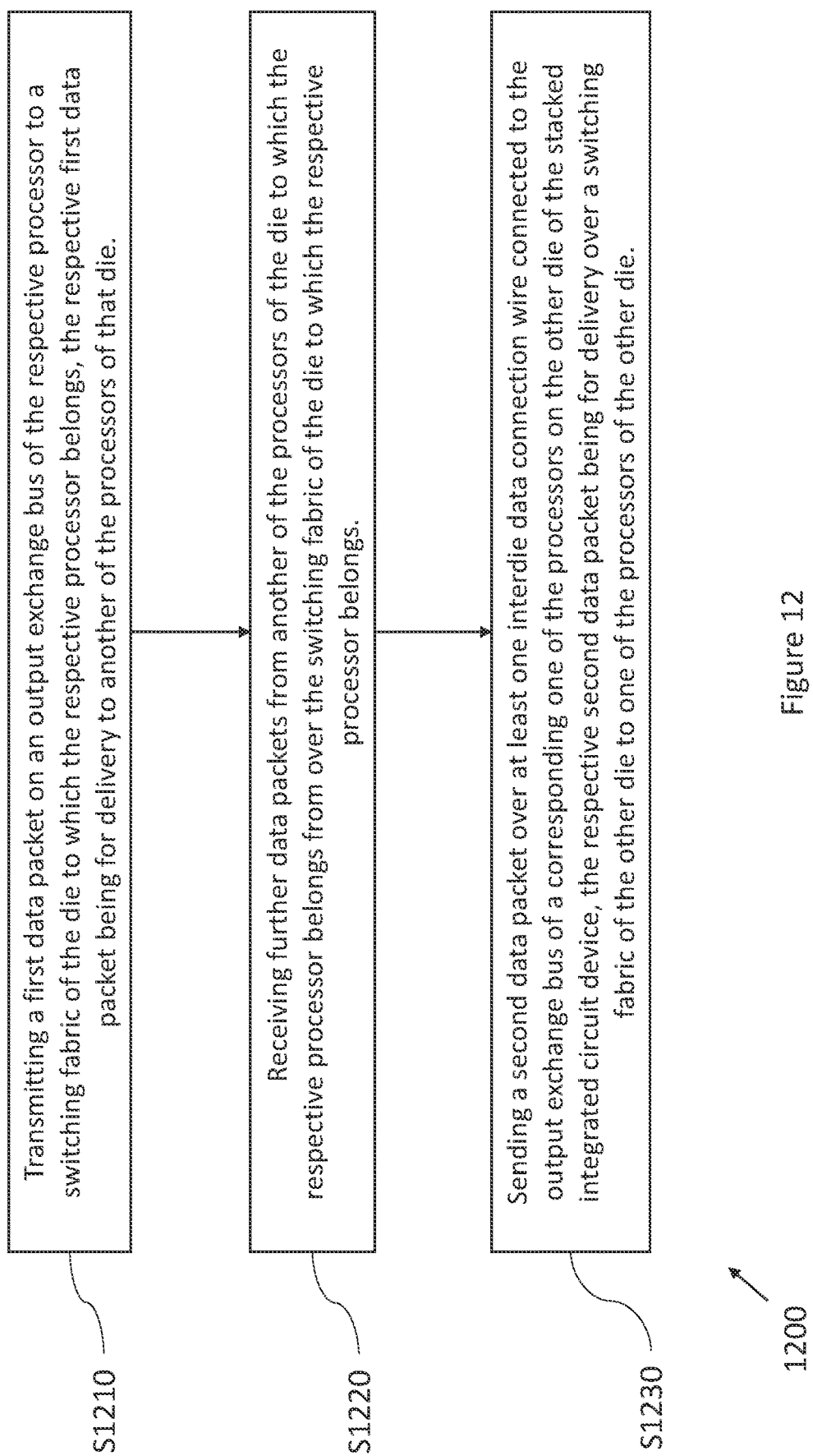
FIG. 12 illustrates a method according to embodiments of the application.

The local programs 72 together form a computer program that runs at least on the stacked integrated circuit device 800. When the instructions of the local programs 72 are executed on the tiles 4 of the device 800 this causes a method to be carried out. Reference is now made to FIG. 12, which illustrates an example of the method 1200. Each of the steps shown in FIG. 12 is performed by each of a plurality of the tiles 4 on both of the die of the device 800.

At S1210, a first data packet is transmitted on an output exchange bus of the respective processor to a switching fabric of the die to which the respective processor belongs, the respective first data packet being for delivery to another of the processors of that die. In example embodiments, the first data packet is transmitted via an output multiplexer associated with the respective processor. The first data packet may be transmitted at a predetermined send time to be received at its destination processor at a predetermined receive time.

At S1220, the respective processor receives further data packets from another of the processors of the die to which the respective processor belongs from over the switching fabric of the die to which the respective processor belongs. The processor may receive these data packets via an input multiplexer connected to the switching fabric. The processor may control the input multiplexer to connect to the switching fabric at a predetermined switch time to receive a further such data packet at predetermined receive time relative to a predetermined send time of the data packet.

At S1230, the respective processor is sends a second data packet over at least one interdie data connection wire connected to the output exchange bus of a corresponding one of the processors on the other die of the stacked integrated circuit device, the respective second data packet being for delivery over a switching fabric of the other die to one of the processors of the other die. The respective processor may send the data packet to an output multiplexer of the corresponding processor. The respective processor may control this multiplexer over an interdie control connection wire to select the input of the multiplexer so that the second data packet is output onto the output exchange bus. The respective processor may send the second data packet at a predetermined send time to be received at the destination processor at a predetermined receive time.

When sending data packets over the exchange wiring as described, it is advantageous to reduce skew in the clock cycle between adjacent pipeline stages along the wires. The distribution of the clock signal to reduce skew when exchanging data between tiles 4 on different die is now described.

Figure 10:
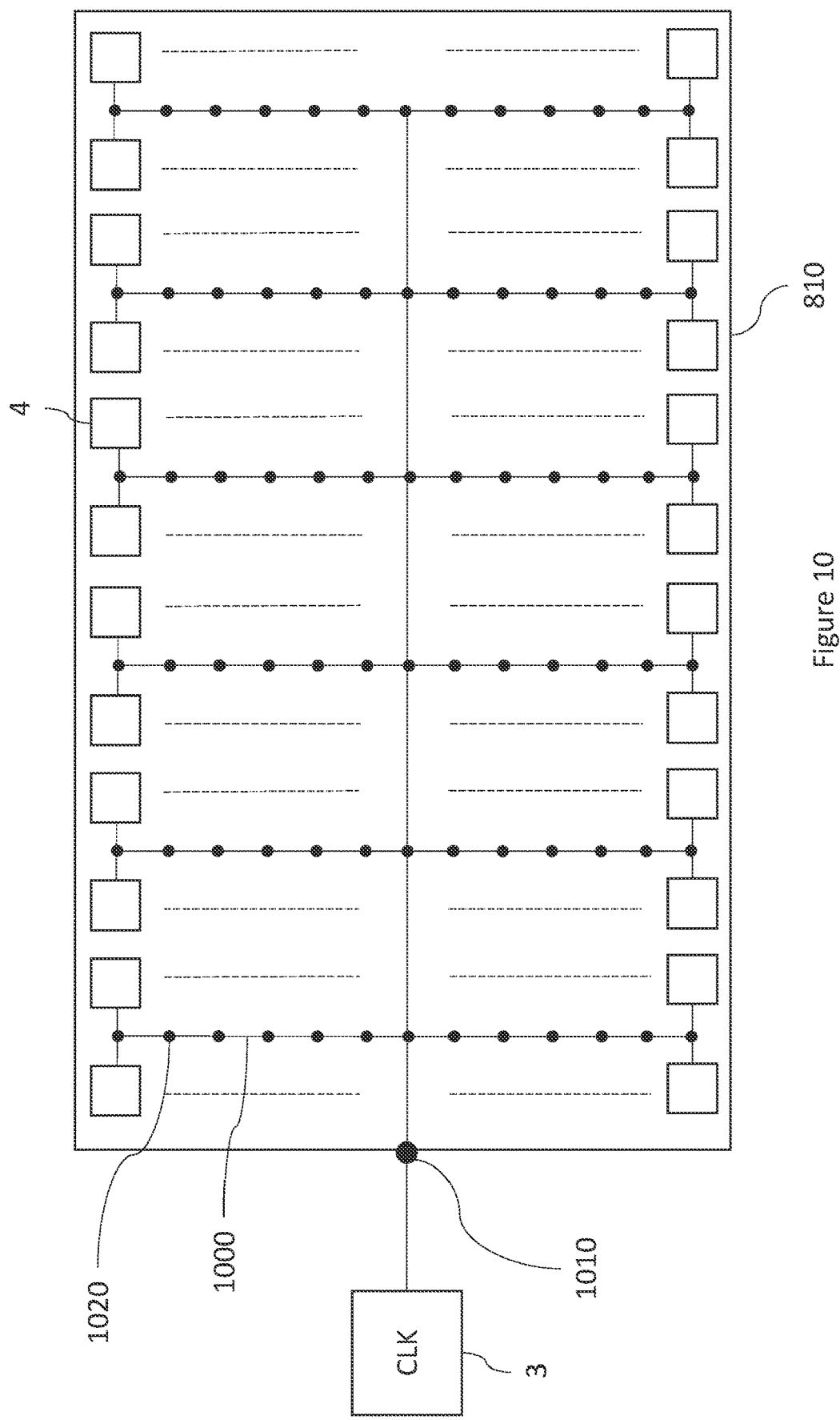
FIG. 10 illustrates the distribution of a clock signal in a single die.

Reference is made to FIG. 10, which illustrates how a clock signal is distributed across the exchange of a single die 810. A clock 3 is shown in the Figure. The clock 3 produces a clock signal, which is provided to the die 810 at an insertion point 1010 on the die 810. At the insertion point 1010, the clock signal is provided via metal contacts on the top portion of the die 810 to the logic of the die 810.

FIG. 10 shows the distribution of the clock signal across the exchange. The clock signal is distributed along the wiring 1000 across the switching fabric 34 and up and down the columns of tiles 4. Each of the points 1020, in FIG. 10 represents a buffer stage 1020 for the clock signal. At each buffer stage 1020, the clock signal is received, rebuffered and transmitted over a further part of the clock distribution wiring 1000.

The clock signal is used to time the transfer of data between pipeline stages along the switching fabric 34 and along the wires, e.g. the output exchange bus 218 and input wires. Clock signalling for the individual pipeline stages along the exchange wiring is derived from the clock signal sent along the wires 1000. Since the clock signal is distributed along a path that is parallel to the path via which data is exchanged, clock skew between adjacent pipeline stages in the exchange is minimised.

Figure 11:
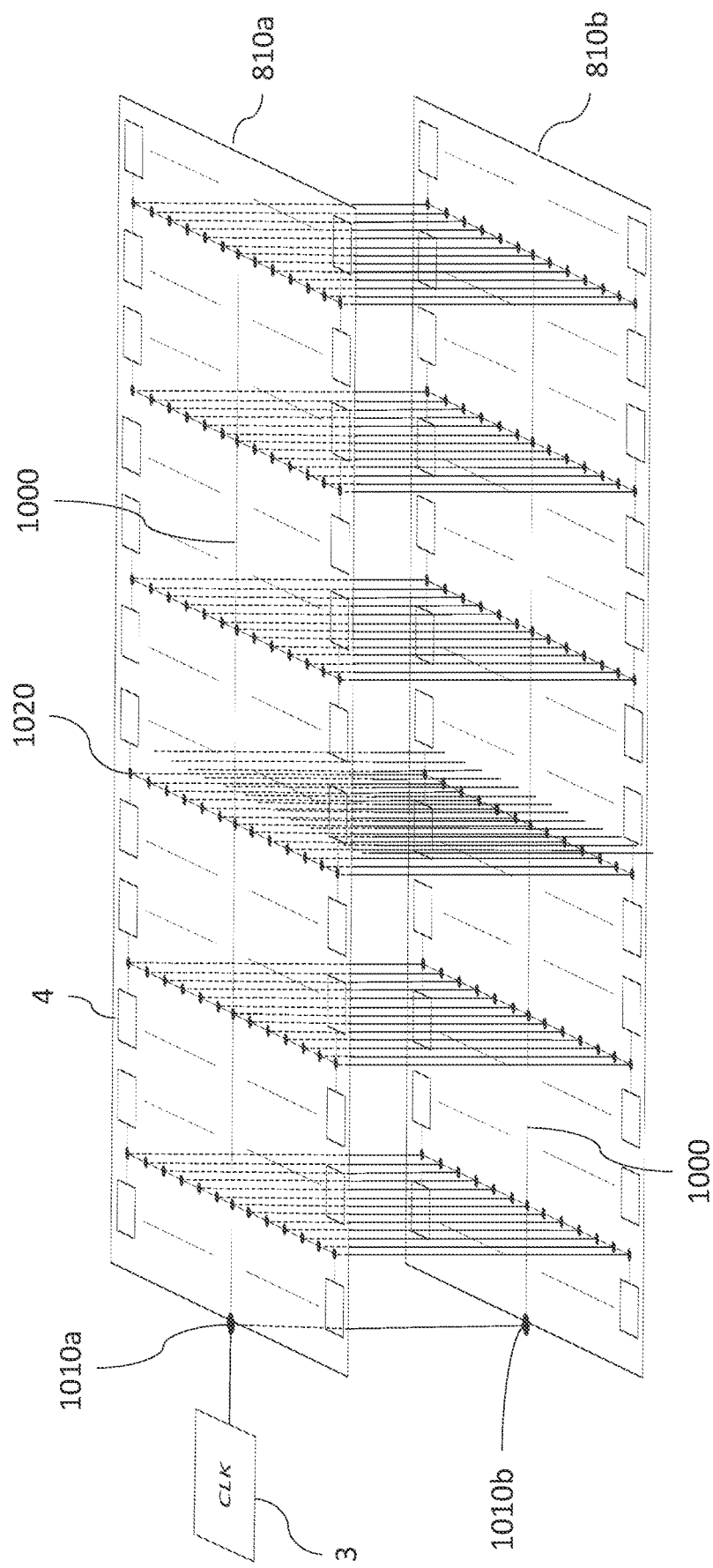
FIG. 11 illustrates the distribution of clock signal in a multi-die stacked device.

Reference is made to FIG. 11, which illustrates how the clock signal is distributed in the stacked device 800.

As shown, the clock signal is inserted to the device at an insertion point 1010*a* of the die 810*a*. This insertion point 1010*a* may be the same as insertion point 1010 discussed above with respect to FIG. 10. The clock signal is provided through the through silicon vias in the substrate of the die 810*a* to the die 810*b* at a further insertion point 1010*b*. This insertion point 1010*b* connects the clock distribution wiring 1000 of die 810*b* to the clock distribution wiring 1000 of die 810*a*. The clock signal is propagated in each die 810*a*, 810*a* along wires 1000 and buffer stages 1020 as described above with respect to FIG. 10.

As the clock signals are propagated along the clock distribution wires 1000 of the device 800, there is the possibility that the clock signals at neighbouring points in the two die may become out of phase with one another. As described earlier, in the stacked device 800, the data is transmitted from one die 810*a* to the other die 810*b* via the interdie connections 219. If there exist substantial phase differences in the clock signal between corresponding points in the die 810*a*, 810*b*, skew between the adjacent pipeline stages along the interdie connections 219 may result. This skew may be referred to as interdie skew.

As shown in FIG. 11, in order to minimise the skew between adjacent pipeline stages between the two die 810*a*, 810*b*, there are a plurality of connections 1110 between the clock distribution wires 1000 of the two die 810*a*, 810*b*. These connections 1110 are formed using through silicon vias in the substrate of the die 810*a*. The presence of the plurality of connections 1110 keeps the clock signal closely aligned in phase at each of the neighbouring pipeline stages across the two die 810*a*, 810*b*. The clock distribution wiring 1000 in the two die may be said to be "stitched together".

In some embodiments, and as shown in FIG. 11, there may be one such connection wire 1110 at each buffer stage 1020 of the clock distribution wiring 1000. This minimises the interdie skew.

A method may also be provided including the steps shown in FIG. 12 and additionally including other steps described above as being performed in in the stacked integrated circuit device 800, such as the distribution of clock signals as described with respect to FIGS. 10 and 11.

Figure 13:
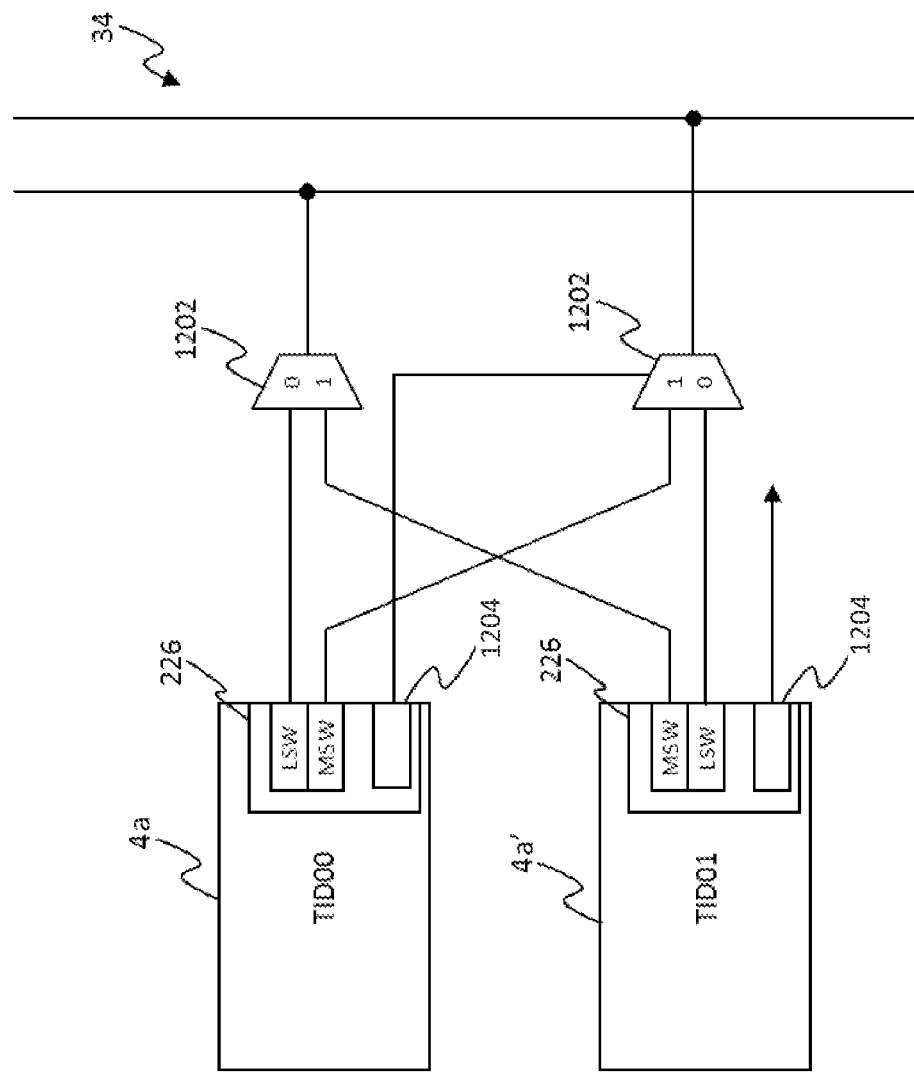
FIG. 13 is a schematic diagram of two tiles operating as a transmitting pair.

A tile on one die may take over the exchange bus of its corresponding tile to transmit to the other die. In addition, in certain embodiments, tiles may cooperate in a pairtile on each individual die for the purpose of sending double width transmissions. FIG. 13 illustrates the logic associated with tiles in a pairtile for performing double width transmission. Double width transmission on the same die is achieved by borrowing the outgoing exchange resources of a neighbour tile on the same die for the duration of a SEND. The neighbour tile is unable to perform its own data transmission during this time. Note that in the case of stacked die, double width transmission on the other die may be achieved by borrowing the outgoing exchange resources of both tiles in a stacked pairtile (the pairtile on the other die). In this case, a neighbour tile on the same die could perform single or double-width exchange at the same time. A SEND instruction is able to perform single or double width data transfer, with the width of the transfer being specified by a value held in a register, or an immediate field. The width can be indicated as 32 bits (one word) in which case the field has a value of 0, or 64 bits (two words) in which case the field has a value of 1. Other logical definitions are possible. The specified width is passed from a register on the respective die to a control store 1204 in the Ex Out interface 226 of the tile. FIG. 13 shows two such paired tiles, 4*a* and 4*a*'. The Ex Out interface 226 has buffers for accommodating the least significant word (LSW) and the most significant word (MSW). In this context, each word is 32 bits. The least significant word is connected directly to an input of a width control multiplexer 1202. The output of the multiplexer is connected to the corresponding cross-wires of the exchange bus 34, the cross-wires corresponding to the output wire for that particular tile. If the transmit width is set at 32 bits, the width control multiplexers 1202 are set to receive inputs from the respective LSW's of the paired tiles, to thereby allow the tiles of the pair to transmit a respective 32 bit word simultaneously.

If one member tile of the pairtile wishes to send a 64 bit word, the width control multiplexer 1202 of the neighbouring tile is set to receive the most significant word output from the sending tile and to pass that to the output of the multiplexer. This will cause the most significant word of the 64 bit output from the sending tile to be placed on the cross wires of the exchange bus associated with the neighbouring tile (which at this point is inhibited from sending anything). For the sake of clarity, the MUX control line from the width control flag in store 1204 of the sending tile 4*a* is shown connected to the control input of the multiplexer 1202 of the neighbouring (non-sending) tile 4*a*'. Similarly, the neighbouring tile 4*a*' also has a MUX control line connected from its control store 1204 to the input of the width control multiplexer 1202 of its paired tile, although this is not shown in FIG. 13 for reasons of clarity.

Figure 14:
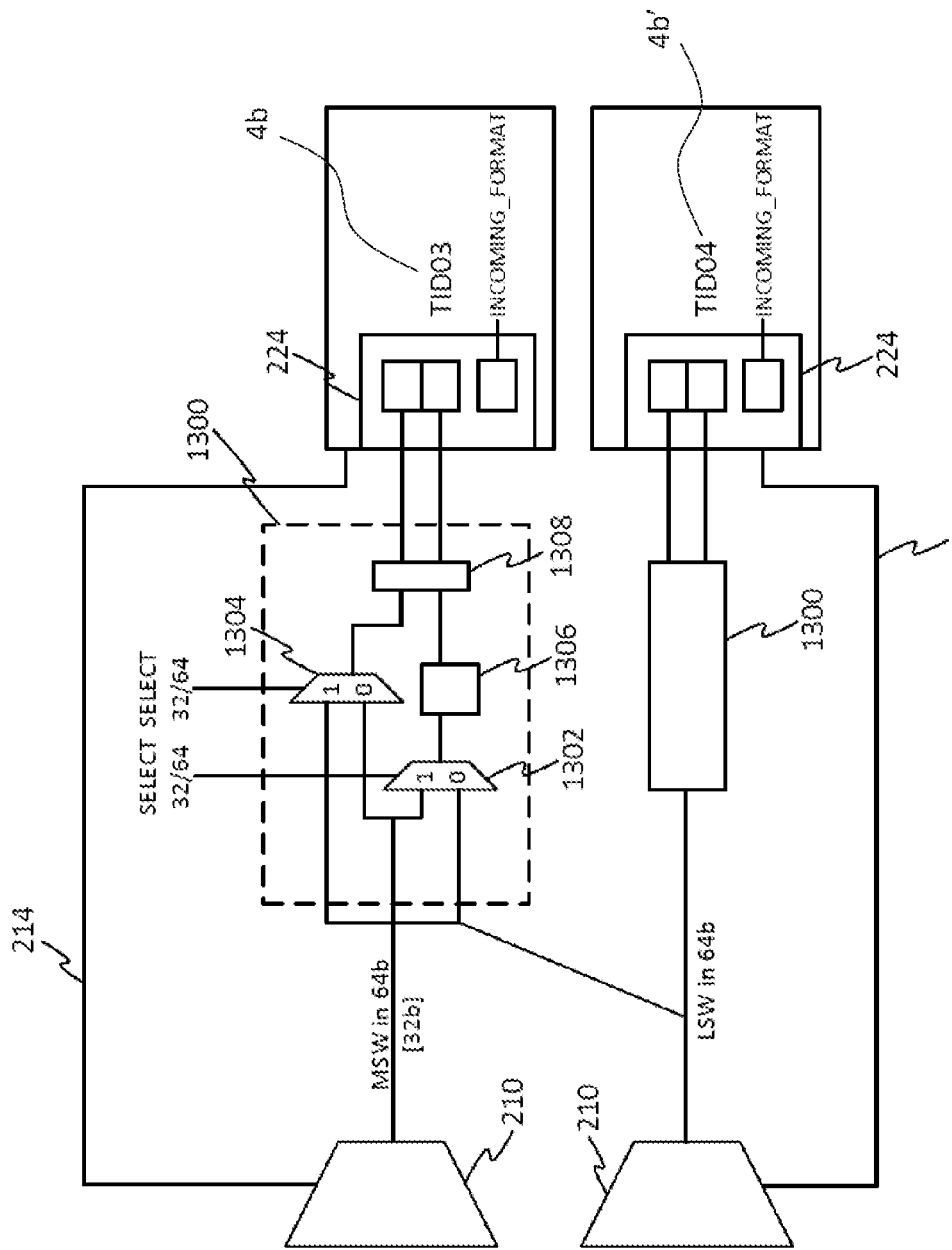
FIG. 14 is a schematic diagram of two tiles operating as a receiving pair.

Reference will now be made to FIG. 14 to explain a double width receive using paired tiles. The paired tiles 4*b*, 4*b*' in FIG. 14 are labelled TID03 and TID04, although it will readily be understood that this functionality can be used in combination with the double width transmit functionality such that a tile like 4*a* could also have the functionality shown on 4*b* for example. Double width receive is achieved by sharing a neighbour's incoming exchange resources for the duration of a transfer. When configured for double width receive, each tile within a pairtile can choose to sample or ignore the incoming data. If they both choose to sample, they will see the same incoming data. Double width receive is enabled in collaboration with the neighbour tile via the INCOMING_FORMAT value described earlier which identifies whether the incoming data is 32 bits or 64 bits. The value of the incoming multiplexer 210 of the primary tile of the tile pair must be set to the tile ID of the sending tile. The 'listening input' of the incoming multiplexer 210 of the secondary tile within the pairtile must be set to the tile ID of the other tile within the sending pair. Note that in this case, strictly speaking, the "sending" tile of the sending tile pair (for example 4*a*') is not actually sending, but has supplied its most significant word to use the exchange resources of tile 4*a*. Thus, the incoming multiplexers 210 of the tiles of the receiving tile pair must be respectively connected to the cross wires on which the individual words of the double width transmission output of the sending pair are placed.

Note that in some embodiments even if the incoming multiplexers 210 are switched to simultaneously listen to their respective cross wires of the exchange, this does not necessarily mean that the incoming values will be received at the tiles of the receiving tile pair simultaneously, due to the differing latencies of travel between the exchange and individual tiles. There are thus, three possibilities to consider in a receiving pair of tiles.

In a first possibility, the two incoming buses of the Exin interface 224 are to be treated independently (neither tile in the pairtile is participating in a double width receive).

According to the second possibility, the local incoming exchange bus is being used to transfer the early component of a double width item (and that component should now be delayed). This implies that the neighbour's bus will be used to transfer the non-early component of the same double width item.

According to the third possibility, the local incoming exchange bus is being used to transfer the non-early component of a double width item. This implies that the neighbour's bus was used to transfer the early component of the same double width item (and therefore the early data component on the neighbour's bus should have been delayed).

FIG. 14 shows circuitry 1300 which deals with these scenarios using multiplexers 1302 and 1304. Note that the circuitry 1300 is duplicated on the input of each tile of the receiving tile pair, but is only shown on the input of 4b for reasons of clarity.

Control of the multiplexer is from the incoming format control which is supplied from a register into an Exin interface 224. If the tile 4b is to operate in a 32 bit mode, it controls the multiplexer 1302 to pass through 32 bit word at the upper input of the multiplexer in FIG. 14 via a pipeline stage 1306 and a control buffer 1308.

If the receiving tiles are operating as a pair, the multiplexer 1302 is controlled to block its upper input and allow the least significant word from the lower input to be passed through to the pipeline stage 1306. On the next cycle, the most significant word is selected to be passed through the multiplexer 1304 into the control buffer 1308, along with the least significant word which has been clocked through the pipeline stage 1306. The control buffer 1308 can decide whether or not to receive the 64 bit word. Note that according to the logic the 64 bit word will simultaneously be received at the neighbouring tile (4b'). In some circumstances both tiles might want to read the same 64 bit value, but in other circumstances one of the tiles may wish to ignore it.

Note that there may be embodiments where the LSW and MSW of a 64 bit transfer may be simultaneously received at their paired receiving tiles, in which case the relative delay of pipeline stage 1306 would not be required.

It will be appreciated that the above embodiments have been described by way of example only.

The invention claimed is:

1. A stacked integrated circuit device comprising:
a first die comprising a first plurality of processors and a first switching fabric for exchanging data between the first plurality of processors; and
a second die comprising a second plurality of processors and a second switching fabric for exchanging data between the second plurality of processors, wherein the second die and first die are stacked together,
wherein for each of the first die and the second die, each of the processors of a respective die has:
an output exchange bus connected to a switching fabric of the respective die for sending a first data packet to another of the processors of the respective die accessible over the switching fabric of the respective die;
at least one input wire for receiving further data packets from another of the processors of the respective die accessible over the switching fabric of the respective die; and
at least one interdie data connection wire connected to the output exchange bus of a corresponding one of the processors on the other die, wherein the respective processor is operable to send, over the at least one interdie data connection wire, a second data packet over the switching fabric of the other die to one of the processors of the other die.

2. The stacked integrated circuit device of claim 1, wherein for each of the first die and the second die, each of the processors of the respective die has an associated output multiplexer for outputting data packets onto the output exchange bus of the respective processor, each output multiplexer having:
a first input for receiving one of the first data packets from its associated processor for outputting the first data packet onto the output exchange bus of the associated processor; and
a second input for receiving one of the second data packets from the corresponding processor of the associated processor via the respective at least one interdie data connection wire of the corresponding processor.

3. The stacked integrated circuit device of claim 2, wherein for each of the first die and the second die, each of the processors of the respective die has an interdie control connection wire connected to the output multiplexer of the corresponding processor for controlling a selection between the first input and the second input.

4. The stacked integrated circuit device of claim 1, wherein for each of the first die and the second die:
each of at least some of the processors of the respective die has an associated input multiplexer configured to receive one of the second data packets from the switching fabric of the respective die,
each of at least some of the processors of the respective die is operable to function as a receiving processor to receive the respective one of the second data packets from a processor on the other die at a predetermined receive time relative to a predetermined send time of the respective one of the second data packets from the processor of the other die, each receiving processor being operable to receive the respective one of the second data packets at the predetermined receive time by controlling its associated input multiplexer to connect to the switching fabric of the respective die at a predetermined switch time.

5. The stacked integrated circuit device of claim 4, wherein each of the predetermined receive time, predetermined send time and predetermined switch time are timed with respect to a synchronisation signal issued by a synchronisation controller of the stacked integrated circuit device.

6. The stacked integrated circuit device of claim 4, wherein each of the first data packets and second data packets is transmitted by one of the processors of the first die and the second die without an identifier of a destination processor.

7. The stacked integrated circuit device of claim 1, wherein the stacked integrated circuit device is configured to operate in:
a compute phase, during which at least some of the processors of the first die and the second die are configured to perform computations on input data to generate results without exchanging data between the processors; and an exchange phase, during which at least some of the processors of the first die and the second die are configured to exchange the first and second data packets with one another, wherein the compute phase is separated from the exchange phase by a predetermined synchronisation barrier.

8. The stacked integrated circuit device of claim 1, wherein the stacked integrated circuit device is configured to operate in:

an intradie exchange period, during which at least some of the processors of the first die are each configured to send data to at least one other processor of the first die without sending data to the processors of the second die, and at least some of the processors of the second die are each configured to send data to at least one other of the processors of the second die without sending data to the processors of the first die; and at a different time, an interdie exchange period, during which at least some of the processors of the first die are each configured to send data to at least one of the processors of the second die without sending data to the processors of the first die, and at least some of the processors of the second die are each configured to send data to at least one of the processors of the first die without sending data to the processors of the second die.

9. The stacked integrated circuit device of claim 8, wherein the intradie die exchange period and interdie exchange period belong to a single instance of an exchange phase during which at least some of the processors of the first die and the second die are configured to exchange the first and second data packets with one another, wherein a compute phase is separated from the exchange phase by a predetermined synchronisation barrier.

10. The stacked integrated circuit device of claim 1, wherein each of the first die and the second die has clock distribution wiring for clocking transfer of data along exchange wiring of the respective die, the exchange wiring including at least the switching fabric, output exchange buses, and interdie data connection wires of the respective die, wherein the stacked integrated circuit device comprises a plurality of interdie clock signal connections, each connecting the clock distribution wiring of the first die to the clock distribution wiring of the second die.

11. The stacked integrated circuit device of claim 10, wherein for each of the first die and the second die, the respective clock distribution wiring has a plurality of buffer stages at which a clock signal is buffered, wherein each of the plurality of interdie clock signal connections connects one of the buffer stages of the first die to one of the buffer stages of the second die.

12. The stacked integrated circuit device of claim 1, wherein each of the plurality of processors on the first die and the second die is configured to run a local program, wherein the local programs are generated as a related set at compile time.

13. The stacked integrated circuit device of claim 1, wherein each of the plurality of processors on the first die and the second die is configured to run a local program, wherein for each of the processors of the first die and the second die, a respective local program is configured to only execute a send instruction to send the respective first data packet over the output exchange bus of the respective processor if a conflict on that output exchange bus would not occur due to sending of data by the respective processor's corresponding processor over that corresponding processor's at least one interdie data connection wire.

14. A method implemented in a stacked integrated circuit device having a first die with a first plurality of processors and a second die with a second plurality of processors, the method comprising:

transmitting a first data packet on an output exchange bus of a first processor, of the first plurality of processors, to a first switching fabric of the first die, the first data packet being for delivery to a second processor, of the first plurality of processors;

receiving further data packets from a third processor, of the first plurality of processors, from over the first switching fabric; and sending a second data packet over an interdie data connection wire coupled to an output exchange bus of a fourth processor, of the second plurality of processors, on the second die, the second data packet being for delivery over a second switching fabric of the second die to a fifth processor, of the second plurality of processors.

15. The method of claim 14, further comprising:

receiving the first data packet at a first input of an output multiplexer associated with the first processor;

receiving a third data packet at a second input of the associated output multiplexer from the fourth processor; and outputting the first data packet and the third data packet to the output exchange bus of the first processor.

16. The method of claim 15, further comprising:

at the output multiplexer associated with the first processor, controlling a selection between the first input and the second input in response to a signal received on another interdie connection wire connected to the fourth processor.

17. The method of claim 14, further comprising:

receiving at an input multiplexer associated with the first processor, a third data packet from the first switching fabric, the third data packet being sent from one of the second plurality of processors;

receiving the third data packet at the first processor at a predetermined receive time relative to a predetermined send time of the third data packet from the one of the second plurality of processors, wherein the third data packet is received at the predetermined receive time by controlling the input multiplexer to connect to a wire of the first switching fabric at a predetermined switch time.

18. The method of claim 17, further comprising issuing a synchronisation signal from a synchronisation controller of the stacked integrated circuit device to each of the processors on the first die and the second die, wherein each of the predetermined receive time, the predetermined send time, and the predetermined switch time are timed with respect to the synchronisation signal issued by the synchronisation controller.

19. The method of claim 17, further comprising transmitting each of the first data packet and the second data packet without an identifier of a destination processor.

20. The method of claim 14, wherein the first processor and the fourth processor are vertical neighbours.

21. The method of claim 14, further comprising:
transmitting a third data packet according to a double width transmission in which the first processor borrows outgoing exchange resources of a pair of processors belonging to the second plurality of processors.

22. A non-transitory computer readable medium storing a computer program comprising a plurality of local programs, wherein a first plurality of the local programs are suitable for execution on a first plurality of processors of a first die of a stacked integrated circuit device, wherein a second plurality of the local programs are suitable for execution on a second plurality of processors of a second die of the stacked integrated circuit device, wherein a first one of the local programs is configured to, when executed on a first processor of the first plurality of processors, cause the first processor to perform the steps of:

transmitting a first data packet on an output exchange bus of the first processor to a first switching fabric of the first die, the first data packet being for delivery to a second processor, of the first plurality of processors;

receiving further data packets from a third processor, of the first plurality of processors, from over the first switching fabric; and sending a second data packet over an interdie data connection wire coupled to an output exchange bus of a fourth processor, of the second plurality of processors, on the second die, the second data packet being for delivery over a second switching fabric of the second die to a fifth processor, of the second plurality of processors.

\* \* \* \* \*